United States Patent
Kim et al.

(10) Patent No.: US 9,669,803 B2
(45) Date of Patent: Jun. 6, 2017

(54) WIPER BLADE

(71) Applicants: ADM21 CO., LTD., Cheongyang-gun, Chungcheongnam-do (KR); In Kyu Kim, Ansan-si, Gyeonggi-do (KR)

(72) Inventors: In Kyu Kim, Ansan-si (KR); Kyung Su Kim, Cheongyang-gun (KR); Kyung Jong Nam, Cheongyang-gun (KR); Cheong Mo Yang, Cheongyang-gun (KR); Jun Mo Lee, Cheongyang-gun (KR)

(73) Assignee: THE KOREA DEVELOPMENT BANK, Seoul (KR)

( * ) Notice: Subject to any disclaimer, the term of this patent is extended or adjusted under 35 U.S.C. 154(b) by 376 days.

(21) Appl. No.: 14/221,465

(22) Filed: Mar. 21, 2014

(65) Prior Publication Data

US 2015/0183401 A1 Jul. 2, 2015

(30) Foreign Application Priority Data

Dec. 31, 2013 (KR) .......................... 10-2013-0168302

(51) Int. Cl.
*B60S 1/38* (2006.01)
*B60S 1/40* (2006.01)

(52) U.S. Cl.
CPC ............. *B60S 1/381* (2013.01); *B60S 1/3806* (2013.01); *B60S 1/4003* (2013.01); *B60S 1/3801* (2013.01);
(Continued)

(58) Field of Classification Search
CPC .............. B60S 1/381; B60S 2001/3815; B60S 2001/408; B60S 1/3801; B60S 2001/4035;
(Continued)

(56) References Cited

U.S. PATENT DOCUMENTS 5,546,627 A * 8/1996 Chen ..................... B60S 1/3801
15/250.39
5,974,620 A 11/1999 Jandin
(Continued)

FOREIGN PATENT DOCUMENTS

CN 1522907 A 8/2004
CN 101168362 A 4/2008
(Continued)

OTHER PUBLICATIONS

FR2499921A1 (machine translation), 1982.*
(Continued)

*Primary Examiner* — Andrew A Horton
(74) *Attorney, Agent, or Firm* — Sughrue Mion, PLLC

(57) ABSTRACT

A wiper blade wherein a spoiler is integrated in a lever assembly. The wiper blade has a wiper rubber and the lever assembly holds the wiper rubber and connects to a wiper arm. The lever assembly has a plurality of rotatably connected levers. A longitudinally extending partial spoiler is formed in at least one of the plurality of levers. The lever assembly includes a lever joint rotatably interconnecting adjacent levers. The lever joint is interposed between one of adjacent levers and the other of the adjacent levers. The lever joint is fitted to the one of the adjacent levers through insertion in the longitudinal direction of the lever assembly and is rotatably coupled to the other of the adjacent levers through pressing.

22 Claims, 21 Drawing Sheets

(52) U.S. Cl.
CPC .. *B60S 2001/3815* (2013.01); *B60S 2001/408* (2013.01); *B60S 2001/4022* (2013.01); *B60S 2001/4035* (2013.01)

(58) Field of Classification Search
CPC ............ B60S 2001/4022; B60S 1/4003; B60S 1/4067–1/4077
USPC ........................................ 15/250.201, 250.46
See application file for complete search history.

(56) References Cited

U.S. PATENT DOCUMENTS

| | | | |
|---|---|---|---|
| 6,336,243 B1 * | 1/2002 | Charng ................. | B60S 1/3806 15/250.201 |
| 6,343,401 B1 | 2/2002 | Harashima | |
| 7,028,368 B2 | 4/2006 | Lee et al. | |
| 7,299,520 B2 | 11/2007 | Huang | |
| 7,421,755 B2 * | 9/2008 | Kinoshita ............. | B60S 1/3849 15/250.32 |
| 7,636,980 B2 | 12/2009 | Nakano | |
| 8,181,308 B2 | 5/2012 | Kwon et al. | |
| 8,286,298 B2 | 10/2012 | Kim | |
| 2008/0098554 A1 | 5/2008 | Cho | |
| 2011/0131750 A1 * | 6/2011 | Kwon ................... | B60S 1/3801 15/250.31 |
| 2012/0054976 A1 | 3/2012 | Yang et al. | |
| 2012/0090125 A1 * | 4/2012 | Uchiyama ............. | B60S 1/3801 15/250.32 |
| 2012/0167328 A1 * | 7/2012 | Song .................... | B60S 1/3801 15/250.361 |
| 2013/0139344 A1 | 6/2013 | Kim et al. | |

FOREIGN PATENT DOCUMENTS

| | | | | |
|---|---|---|---|---|
| EP | 0354279 | A1 | 2/1990 | |
| FR | 2499921 | A1 * | 8/1982 | ............ B60S 1/3801 |
| JP | 2000-255387 | A | 9/2000 | |
| JP | 2001525750 | A | 12/2001 | |
| JP | 2011116365 | A | 6/2011 | |
| JP | 4985058 | B2 | 7/2012 | |
| KR | 10-2001-0030699 | A | 4/2001 | |
| KR | 10-2006-0051763 | A | 5/2006 | |
| KR | 20-2009-0001292 | U | 2/2009 | |
| KR | 10-0937206 | B1 | 1/2010 | |
| KR | 10-1027384 | B1 | 4/2011 | |
| KR | 1020110125035 | A | 11/2011 | |
| KR | 10-1245514 | B1 | 4/2013 | |
| KR | 10-1254778 | B1 | 4/2013 | |
| KR | 10-1335312 | B1 | 12/2013 | |

OTHER PUBLICATIONS

Definition of pin at Dictionary.com, 2016.*
FR2499921A1 (English translation), 1982.*
European Patent Office, Communication dated Aug. 10, 2015 issued in corresponding European application No. 14161892.6.
Japanese Patent Office, Communication (Notice of Allowance) dated Apr. 3, 2015, issued in counterpart Japanese Application No. 2014-061209.
Korean Intellectual Patent Office, Communication dated May 9, 2014, issued in corresponding Korean application No. 10-2013-0168302.
State Intellectual Property Office of the P.R.C.; Communication dated Jul. 11, 2016 in counterpart application No. 201410126729.3.

* cited by examiner

WIPER BLADE

CROSS-REFERENCE TO RELATED APPLICATIONS

This application claims priority from Korean Patent Application No. 10-2013-0168302 (filed on Dec. 31, 2013), the entire subject matter of which is incorporated herein by reference.

TECHNICAL FIELD

The present disclosure relates to a wiper blade with a spoiler integrated therein.

BACKGROUND

Motor vehicles are equipped with a windshield wiper device for cleaning or wiping a surface of a windshield. The windshield wiper device includes a wiper blade, a wiper arm and a wiper motor oscillating the wiper arm. The wiper blade is placed on the surface of the windshield and is separably coupled to the distal end of the wiper arm. The wiper blade wipes the surface of the windshield while sliding thereon through oscillation motions of the wiper arm.

The wiper blade includes a wiper rubber and a lever assembly. The wiper rubber contacts the windshield surface. The lever assembly holds and supports the wiper rubber along its longitudinal direction. The lever assembly includes a main lever and a plurality of yoke levers linked to the main lever. The main lever is connected to the wiper arm. The yoke lever is linked to the main lever or another yoke lever at its middle. The main lever and the yoke lever are hinge-jointed by means of a pin or rivet.

When a motor vehicle runs, wind or air stream impinging against the windshield applies a force to the wiper blade along the longitudinal direction of the wiper blade. The wiper blade generally stands upright on the surface of the inclined windshield. Thus, the force applied by the wind or air stream acts to lift the wiper blade from the surface of the windshield. The faster the motor vehicle runs, the stronger such a lift force becomes. This weakens the contact between the wiper rubber and the windshield surface, thereby deteriorating wiping performance.

To address the deterioration in wiping performance caused by the lift of a wiper blade, it is known in the art to attach a spoiler to the wiper blade. The spoiler interacts with wind or air stream and thereby applies a force in a direction opposite to the lift of the wiper blade. By way of example, Korean Patent Application Publication No. 10-2001-0030699 proposes a wiper blade with a spoiler attached to a main lever. It is also known in the art to attach a cover to a wiper blade so as to cover a main lever and a yoke lever. By way of another example, Korean Patent Application Publication No. 10-2006-0051763 proposes a wiper blade with such a cover.

SUMMARY

The lower an overall height of the lever assembly holding the wiper blade, the less air resistance the lever assembly could be subjected to. However, reducing the height of the prior art lever assembly of the wiper blade is difficult due to a furcate configuration of its levers. The wiper blade with the spoiler attached to the lever assembly requires that the spoiler be prepared separately from the lever assembly. This may increase manufacturing costs due to the manufacture and attachment of the spoiler and further lead to detachment of the spoiler from the wiper blade. Further, the wiper blade with the cover covering the lever assembly requires parts for joining the cover to the lever assembly. This may increase the number of the parts of the wiper blade, increasing manufacturing costs.

Further, the prior art lever assembly of the wiper blade provides the hinge-joint between the main lever and the yoke lever by using a connection element such as a pin or rivet. The hinge-joint using such a connection element may increase the number of the parts of the wiper blade and cannot achieve each assembly of the wiper blade.

The present disclosure is directed to solving the aforementioned problems of the prior art. The present disclosure provides a wiper blade wherein a lever assembly holding a wiper rubber has a low overall height and is integrated with a spoiler. Further, the present disclosure provides a wiper blade wherein the lever assembly can be assembled through easy manipulation. Further, the present disclosure provides a wiper blade which has the aforementioned functions and is applicable to at least two types of wiper arms.

Embodiments disclosed herein provide a wiper blade wherein a spoiler is integrated in a lever assembly configured to hold the wiper rubber.

In one exemplary embodiment, the wiper blade includes a wiper rubber and a lever assembly holding the wiper rubber and being connectable to a wiper arm. The lever assembly includes a plurality of levers, adjacent levers of which are rotatably connected to each other. At least one of the plurality of levers has a partial spoiler extending in a longitudinal direction of the lever assembly. Further, the lever assembly includes a lever joint that is interposed between an inner surface of one of the adjacent levers among the plurality of levers and an outer surface of the other of the adjacent levers to rotatably interconnect the adjacent levers. The lever joint is fitted to the one of the adjacent levers through insertion in the longitudinal direction and is rotatably coupled to the other of the adjacent levers through pressing.

In an embodiment, the one of the adjacent levers includes a pair of fitting protrusions extending in the longitudinal direction, and the other of the adjacent levers includes a pair of fitting protrusions protruding in a width direction of the lever assembly. The lever joint includes a pair of fitting grooves, to which the fitting protrusions of the one of the adjacent levers are fitted respectively, and a pair of fitting holes, to which the fitting protrusions of the other of the adjacent levers are fitted respectively.

In an embodiment, the lever assembly comprises: a first lever connectable to the wiper arm; a pair of second levers connected to respective longitudinal outer ends of the first lever; and a pair of third levers connected to respective longitudinal outer or inner ends of the second levers. The lever joint is interposed between an inner surface of the first lever and an outer surface of the second lever. The partial spoiler comprises a first partial spoiler formed in the first lever and a second partial spoiler formed in the second lever.

In an embodiment, the second lever includes a spoiler cover that is disposed at a portion of the second lever and is formed with the second partial spoiler. In this embodiment, the second lever includes a pair of engagement lugs at the longitudinal inner end thereof and a pair of concavities at the longitudinal outer end thereof. The spoiler cover includes a pair of notches, to which the pair of engagement lugs are fitted respectively, at a longitudinal inner end thereof and a pair of dents, which snap-engage the concavities respectively, at a longitudinal outer end thereof. Further, the first lever has a pair of first inclined surfaces defining the first partial spoiler. The first inclined surfaces extend in a longitudinal direction of the first lever and are inclined inwardly of the first lever in a width direction of the first lever. The spoiler cover has a pair of second inclined surfaces defining the second partial spoiler. The second inclined surfaces extend in a longitudinal direction of the spoiler cover and are inclined inwardly of the spoiler cover in a width direction of the spoiler cover. The spoiler cover may be integrated in the portion of the second lever.

In an embodiment, the first lever has an end surface, which is inclined towards a distal end of the lever assembly, at the longitudinal outer end and the second lever has a stepped surface opposite the end surface of the first lever and inclined towards the distal end of the lever assembly.

In an embodiment, the lever assembly includes an insertion opening at a middle portion thereof and a rotating shaft mounted to the insertion opening in a width direction of the lever assembly. The wiper blade further includes a connector assembly for connection to the wiper arm. The connector assembly is fitted to the insertion opening and is coupled to the rotating shaft.

In an embodiment, the connector assembly includes: an adaptor rotatably coupled to the rotating shaft and configured to contact a coupling element provided at a distal end of the wiper arm; and a clamping cover pivotable between a clamping position for clamping the coupling element of the wiper arm and a release position for releasing fixation of the coupling element of the wiper arm. The coupling element of the wiper arm comprises a hook portion and a pin portion. In this embodiment, the clamping cover includes a first elastic latch, which engages the pin portion in the clamping position, and a second elastic latch, which extends from the first elastic latch and presses the hook portion against the adaptor in the clamping position. The second elastic latch extends from the first elastic latch in a wavy shape.

In another exemplary embodiment, the wiper blade includes a wiper rubber, a first lever, a pair of second levers, a pair of third levers, and a pair of lever joints. The first lever has a centrally located insertion opening, a pair of first partial spoilers extending from the insertion opening to respective longitudinal outer ends, and a rotating shaft mounted to the insertion opening in a width direction. The second levers are connected to the respective longitudinal outer ends of the first lever and have a finger for grasping the wiper rubber at a longitudinal outer end thereof. Further, the second lever includes a spoiler cover that is disposed between the longitudinal outer end of the first lever and the longitudinal outer end of the second lever and has a longitudinally extending, second partial spoiler. The third levers are rotatably connected to respective longitudinal inner ends of the second levers at a middle thereof and have fingers for grasping the wiper rubber at both longitudinal ends thereof. The lever joint is interposed between an inner surface of the first lever and an outer surface of the second lever. The lever joint is fitted to the first lever through insertion in the longitudinal direction of the first lever and is rotatably coupled to the second lever through pressing.

In an embodiment, the first lever includes a pair of fitting protrusions extending in the longitudinal direction thereof and the second lever includes a pair of fitting protrusions, which protrude in a width direction of the second lever, at the outer surface. The lever joint includes a pair of fitting grooves, to which the fitting protrusions of the first lever are fitted respectively, at a lower edge thereof and a pair of fitting holes, to which the fitting protrusions of the second lever are fitted respectively, at a middle portion thereof.

In an embodiment, the first lever includes a cutout in the fitting protrusion of the first lever. The lever joint includes a latch that is located in the fitting groove and engages the cutout.

In an embodiment, the second lever includes a pair of engagement lugs at the longitudinal inner end thereof and a pair of concavities at the longitudinal outer end thereof. The spoiler cover includes a pair of notches, to which the pair of engagement lugs are fitted respectively, at a longitudinal inner end thereof and a pair of dents, which protrude inwardly to snap-engage the concavities of the second lever respectively, at a longitudinal outer end thereof.

The wiper blade according another exemplary embodiment further includes: a bracket fitted to the insertion opening; an adaptor fitted to the bracket and rotatably coupled to the rotating shaft; and a clamping cover pivotally coupled to the bracket opposite the adaptor. The adaptor is configured to contact a coupling element provided at a distal end of a wiper arm. The clamping cover is pivotable between a clamping position for clamping the coupling element of the wiper arm to the bracket or the adaptor and a release position for releasing fixation of the coupling element of the wiper arm to the bracket or the adaptor.

In an embodiment, the clamping cover includes a pair of stopper tabs at an upper edge thereof and a pair of snap protrusions at a lower edge thereof. The bracket includes a pair of stopper notches, on which the pair of stopper tabs are seated, at an upper edge thereof and a pair of indents, to which the pair of snap protrusions snap-engage, at a lower edge thereof.

The coupling element of the wiper arm, to which the wiper blades according to the embodiments are connectable, includes a hook portion and a pin portion. In an embodiment, the first lever includes a pair of first through holes, which are adjacent to the rotating shaft and are perforated in a width direction. The pin portion of the coupling element passes through the first through holes. The adaptor includes a curved seat surface on which the hook portion is seated. The clamping cover includes a first elastic latch and a second elastic latch extending from the first elastic latch. When the clamping cover is positioned in the clamping position, the first elastic latch is located in the first through holes to engage the pin portion and the second elastic latch presses the hook portion against the curved seat surface.

In this embodiment, the second elastic latch includes: a first curved section extending from the first elastic latch; a second curved section extending from the first curved section and being curved reversely to the first curved section; and a third curved section extending from the second curved section and being curved as the same direction as the first curved section. The second elastic latch presses the hook portion against the curved seat surface at the second curved section.

The coupling element of the wiper arm, to which the wiper blades according to the embodiments are connectable, further includes another pin portion having a diameter smaller than said pin portion. The first lever includes a pair of second through holes, which are adjacent to the rotating shaft and are perforated in the width direction opposite to the first through holes. Said another pin portion passes through the second through holes. The adaptor includes a bearing hole aligned with the second through holes. Said another pin portion is fitted to the bearing hole.

In an embodiment, the first lever includes a positioning notch at an edge of the insertion opening and the bracket includes a positioning ridge corresponding to the positioning notch.

In the wiper blades according to the embodiments, the levers constituting the lever assembly are straight adjoined and the spoiler is integrated in each lever, providing the wiper blade that has a low overall height and an integrally-formed spoiler. The lever joint of the lever assembly of the wiper blade according to the embodiments is fitted to one of the adjacent levers through insertion in the longitudinal direction and is coupled to the other of the adjacent levers through pressing, providing a lever assembly of a wiper blade with a small number of parts and the benefit of ease of assembly. Further, the wiper blade according to the embodiments includes the connector assembly that is configured to be suitable for a hook wiper arm and a side pin wiper arm. Thus, the wiper blade is connectable to these two types of wiper arms.

BRIEF DESCRIPTION OF THE DRAWINGS

Arrangements and embodiments may be described in detail with reference to the following drawings in which like reference numerals refer to like elements or components, wherein.

DETAILED DESCRIPTION

Figure 1:
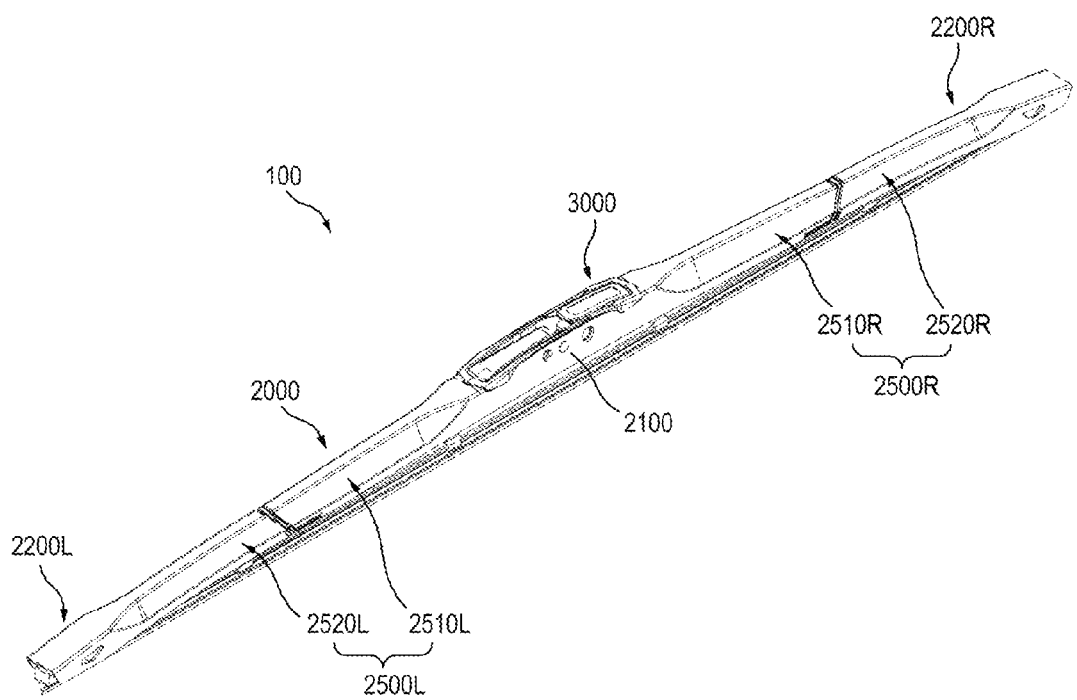
FIG. 1 is a perspective view showing a wiper blade in accordance with an embodiment.
Figure 2:
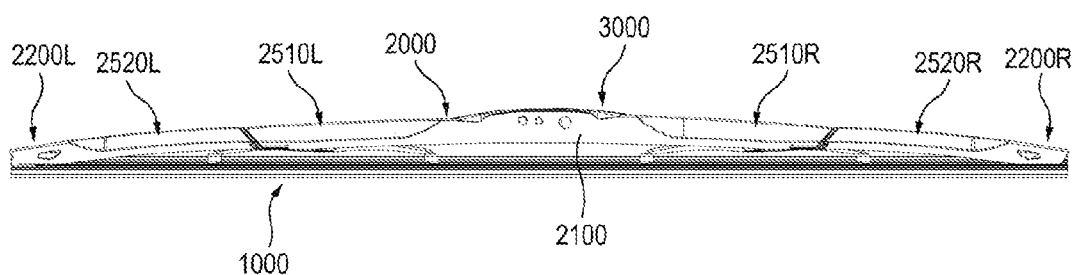
FIG. 2 is a front view of the wiper blade shown in FIG. 1.
Figure 3:
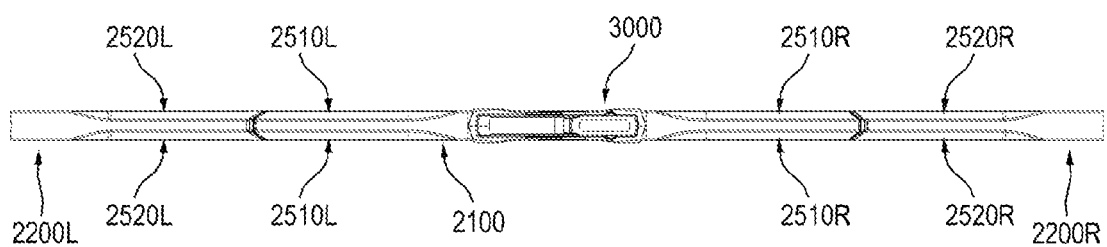
FIG. 3 is a top view of the wiper blade shown in FIG. 1.

Detailed descriptions are made as to embodiments of a wiper blade with reference to the accompanying drawings. The directional term "upper," "upward" or the like as used herein is generally based on a position, in which a lever assembly is disposed relative to a wiper rubber in the drawings, while the directional term "lower," "downward" or the like generally refers to a direction opposite to the upper or upward direction. A wiper blade shown in the accompanying drawings may be otherwise oriented and the aforementioned directional terms may be interpreted accordingly. Further, as used herein, the term "longitudinal inner end" generally refers to an end that is closer to a center of a wiper blade in a longitudinal direction of an element, while the term "longitudinal outer end" refers to an end that is distant from the center of the wiper blade in the longitudinal direction of the element.

Wiper blades according to embodiments include a wiper rubber assembly, a lever assembly and a connector assembly. The wiper rubber assembly includes a wiper rubber to be placed in contact with the surface of a windshield. The lever assembly holds and supports the wiper rubber assembly. The connector assembly is separably coupled to the lever assembly and connects the lever assembly to a wiper arm.

The lever assembly includes a plurality of levers, which are joined straight in a longitudinal direction of the wiper rubber. The levers are rotatably coupled to each other through a hinge joint using a fitting protrusion and a fitting hole. In one embodiment, the lever assembly includes a lever joint for hinge jointing between the levers. The lever joint is fitted to one of the adjacent two levers through insertion in the longitudinal direction of the lever assembly, while being rotatably coupled to the other of the adjacent two levers through snap engagement by pressing. The fitting of the lever joint, which is made through insertion in the longitudinal direction, is accomplished by a longitudinally extending fitting protrusion to a longitudinally extending fitting groove. The snap engagement of the lever joint, which is made by pressing, is accomplished by fitting a laterally protruding fitting protrusion to a laterally perforated fitting hole. When the adjacent two levers are coupled by the lever joint, the lever joint is interposed between the inside or inner surface of the one of the adjacent two levers and the outside or outer surface of the other of the adjacent two levers, such that the lever joint is not exposed outwardly of the lever assembly.

The plurality of the levers of the lever assembly comprise a first lever, to which the connector assembly for connection to a wiper arm is separably mounted, and other levers which are rotatably coupled to the first lever and hold the wiper rubber. In one embodiment, the lever assembly comprises a first lever centrally located in the lever assembly, and a pair of second levers coupled to longitudinal outer ends of the first lever respectively. The second lever has fingers grasping the wiper rubber at respective longitudinal ends. The lever assembly of this embodiment can hold and support the wiper rubber at four pressure points. In another embodiment, the lever assembly comprises a first lever, a pair of second levers coupled to longitudinal outer ends of the first lever respectively, and a pair of third levers coupled to a longitudinal inner or outer end of the second lever respectively. In this embodiment, the first lever is centrally located in the lever assembly. Further, the second levers are located longitudinally outward of the first lever and the third levers are located outwardly of the second lever or between the first lever and the second lever. The second lever has one finger grasping the wiper rubber and the third lever has two fingers grasping the wiper rubber. Thus, the lever assembly of this embodiment can hold and support the wiper rubber at six pressure points. In still another embodiment, the lever assembly comprises a first lever, a pair of second levers coupled to longitudinal outer ends of the first lever respectively, a pair of third levers coupled to longitudinal outer ends of the second lever respectively, and a pair of fourth levers coupled to a longitudinal inner or outer end of the third lever respectively. In this embodiment, the second and third levers have one finger grasping the wiper rubber and the fourth lever has two fingers grasping the wiper rubber. Thus, the lever assembly of this embodiment can hold and support the wiper rubber at eight pressure points.

In an embodiment, the first lever and the second lever are rotatably connected through said lever joint, while the second lever and the third lever are rotatably connected by fitting protrusions and fitting holes. In another embodiment, the second lever and the third lever are also rotatably connected by said lever joint. In such an embodiment, the third lever is connected to the longitudinal outer end of the second lever.

The wiper blades according to embodiments include a spoiler that produces a reaction force preventing the lift of the wiper blade, which wind or air stream may cause. The spoiler is integrated in the lever assembly along the longitudinal direction of the lever assembly. In one embodiment, a partial spoiler, which becomes a part of said spoiler, is integrated in two or more levers of the plurality of levers of the lever assembly. Since the levers are adjoined straight, the partial spoilers integrated in the respective levers are adjoined one after another, thereby forming a portion or the entirety of the spoiler.

In the wiper blades according to embodiments, the partial spoiler is defined by a pair of inclined surfaces that extend in the longitudinal direction of the lever and are inclined inwardly of the lever in the width direction of the lever. Said inclined surfaces form the portion or the entirety of lateral surfaces of the lever. The inclined surface may include a flat surface, a concave or convex curved surface, etc., when viewing the lever from the side or cross-section. Further, when viewing the lever from the side or cross-section, the inclined surfaces may be at least partially symmetrical in a width direction of the lever. Further, one of the pair of the inclined surfaces may have a width larger than that of the other. Further, the width of the inclined surface may be constant or diminish towards a distal end of the lever assembly.

In one embodiment, the first lever of the lever assembly has, at its left and right sides, a pair of first inclined surfaces, which form a first partial spoiler of said spoiler. Further, the second lever has a pair of second inclined surfaces that form a second partial spoiler of said spoiler. Since the second lever is coupled to each of the longitudinal outer ends of the first lever in the assembled lever assembly, the pair of the inclined surfaces forming the first partial spoiler and the pair of the inclined surfaces forming the second partial spoiler are adjoined, thereby forming said spoiler.

In one embodiment, the second partial spoiler, which the second lever includes, is defined by a pair of inclined surfaces of a spoiler cover, which is separably coupled to a portion of the second lever or is integrated in a portion of the second lever. The spoiler cover is separably coupled to the second lever in such a manner that one end of the spoiler cover is fitted to a lug or protrusion formed at one end of the second lever and the opposite end of the spoiler cover is snap-engaged to the second lever. The second lever of some embodiments does not include the spoiler cover. Instead, a portion of the second lever includes a pair of inclined surfaces forming said second partial spoiler.

The wiper blades according to embodiments are suitable for either a "hook wiper arm" including a hook-shaped coupling element at its distal end or a "side pin wiper arm" including a pin-shaped coupling element at its distal end. The connector assembly, which is separably coupled to the first lever of the lever assembly, accomplishes the connection to those wiper arms. The connector assembly of the wiper blades according to embodiments includes an adaptor, to which a hook portion of said hook-shaped coupling element is seated, and a clamping cover, which clamps the hook portion of the hook-shaped coupling element and a pin portion of the pin-shaped coupling element. The clamping cover is pivotable between a clamping position for clamping the hook-shaped coupling element or the pin-shaped coupling element and a release position for releasing the fixation of the coupling element. The clamping cover includes a first elastic latch clamping the pin portion and a second elastic latch for clamping the hook portion. If the clamping cover is fixed to the connector assembly in the clamping position when connecting the wiper blade according to embodiments to the hook wiper arm, the second elastic latch presses the hook portion against the adaptor. If the clamping cover is fixed to the connector assembly in the clamping position when connecting the wiper blade according to embodiments to the side pin wiper arm, the first elastic latch engages the pin portion. In one embodiment, the second elastic latch extends from the first elastic latch in a wavy shape and thus can press the hook portion with stronger pressure force.

FIGS. 1 to 39 show a wiper blade according to an embodiment, generally denoted by 100, and elements or components constituting the wiper blade 100. The wiper blade 100 includes a wiper rubber assembly 1000, a lever assembly 2000 and a connector assembly 3000. The wiper rubber assembly 1000 includes a wiper rubber that is to be placed on a surface of a windshield of a motor vehicle. The lever assembly 2000 holds and supports the wiper rubber assembly 1000. The connector assembly 3000 facilitates connection to a wiper arm and is separably coupled to the lever assembly 2000.

The wiper rubber assembly 1000 includes a wiper strip or wiper rubber 1100, which is placed in contact with the surface of the windshield, and spring rails 1200, which are fitted to the wiper rubber 1100 and impart rigidity to the wiper rubber 1100.

Figure 6:
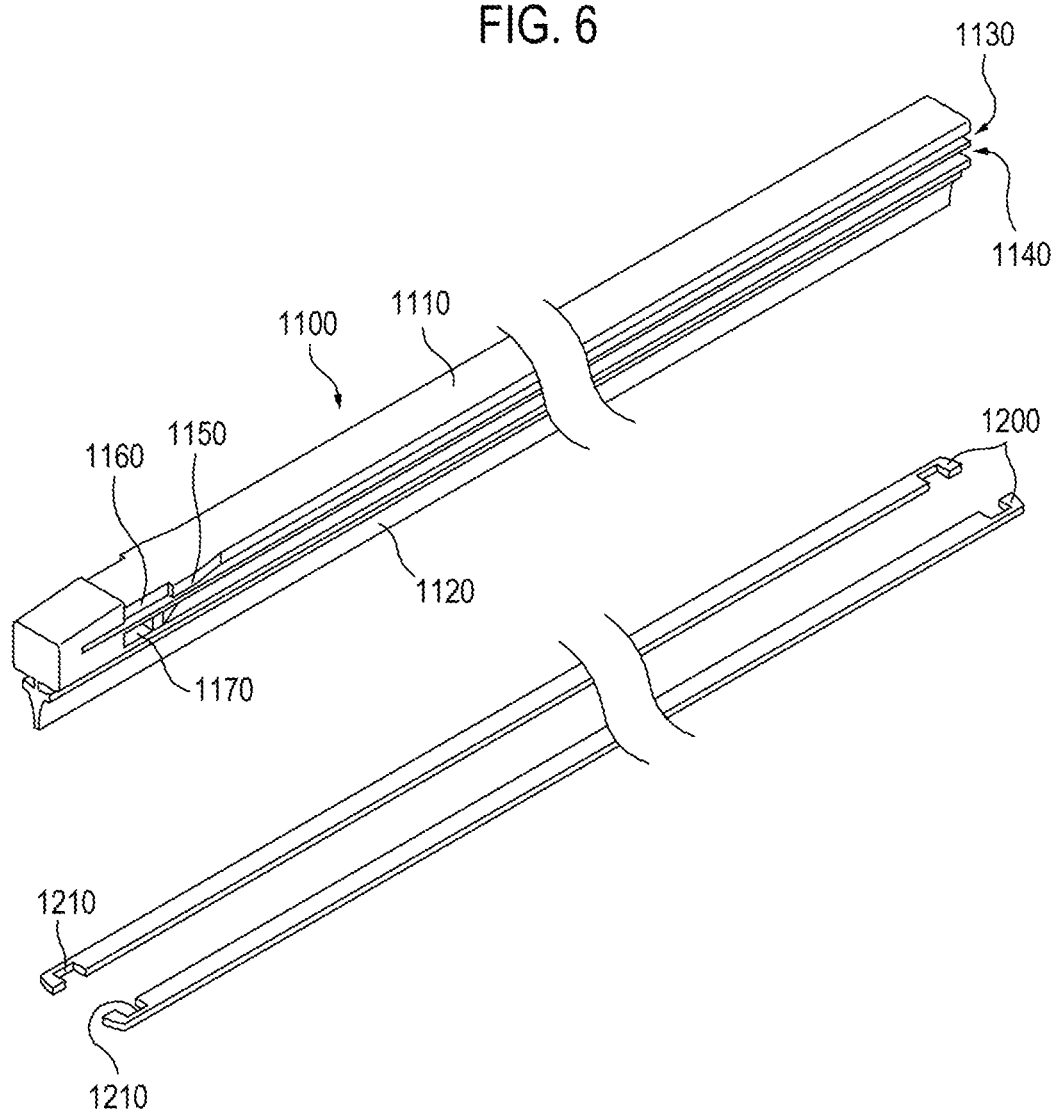
FIG. 6 is a perspective view showing a wipe rubber and spring rails constituting a wiper rubber assembly of the wiper blade according to an embodiment.
Figure 7:
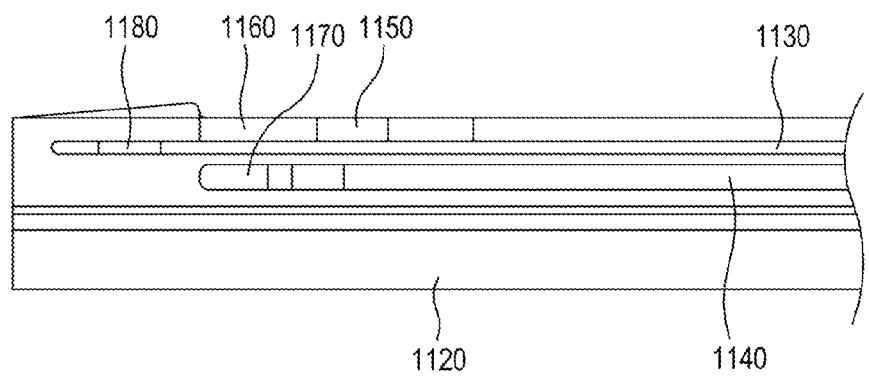
FIG. 7 is a fragmental front view of the wiper rubber shown in FIG. 6.
Figure 8:
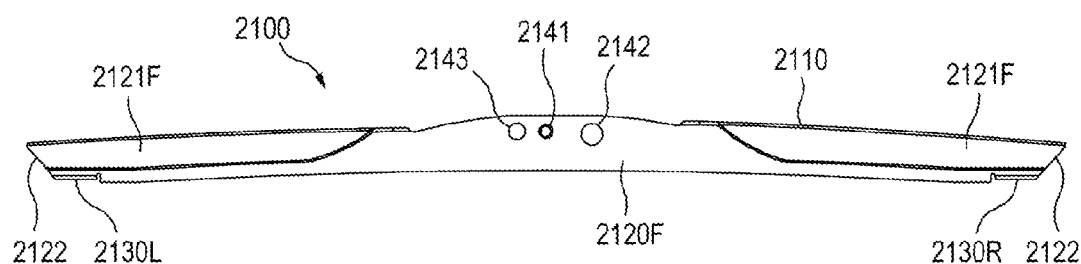
FIG. 8 is a front view showing a first lever of the lever assembly.
Figure 9:
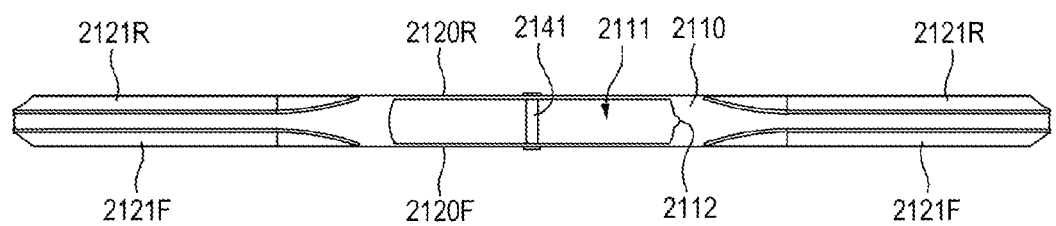
FIG. 9 is a top view of the first lever shown in FIG. 8.
Figure 10:
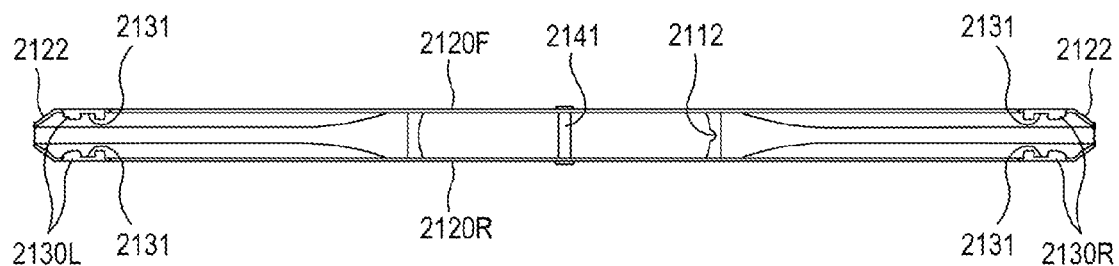
FIG. 10 is a bottom view of the first lever shown in FIG. 8.

The wiper rubber 1100 is made from a rubber or plastic material having elasticity. Referring to FIGS. 6 and 7, the wiper rubber 1100 has an elongated body portion 1110 and a wiper lip 1120 longitudinally extending beneath the body portion 1110 and contacting the windshield surface. Further, the wiper rubber 1100 has, at either side of the body portion 1110, two rows of grooves 1130, 1140 that extend in the longitudinal direction of the wiper rubber. A first groove 1130 extends along the body portion 1110 immediately below a top side of the body portion 1110. A second groove 1140 extends along the body portion 1110 below the first groove 1130. The spring rails 1200 are inserted to the first grooves 1130 respectively. Fingers provided in levers of the lever assembly 2000 are fitted to the second grooves 1140. Further, a portion, to which outermost fingers of the fingers of the levers are fitted, is formed in the vicinity of one end of the wiper rubber 1100. That is, in the vicinity of the one end of the wiper rubber 1100, stoppers 1150 protrude between the top side and the first grooves 113 and recesses 1160 are defined in edges of the top side due to the stoppers 1150. Further, insertion holes 1170, to which the ends of the outermost fingers are fitted, are formed below the recesses 1160 in the second grooves 1140 in the vicinity of one end of the second groove 1140. When the wiper rubber assembly 1000 and the lever assembly 2000 are assembled together, the ends of the outermost fingers are fitted to the insertion holes 1170 and the ends of other fingers are inserted to the second grooves 1140. Thus, the wiper rubber assembly 1000 is held by the lever assembly 2000.

The spring rails 1200 (referred to as a "vertebra" in the art) are inserted to the first grooves 1130 of the wiper rubber 1100 respectively. The spring rails 1200 impart rigidity to the wiper rubber 1100 and distribute the pressure applied by a wiper arm along the longitudinal direction of the wiper rubber 1100. The spring rails 1200 are made from a metallic material and have a shape of a thin elongated bar. The spring rail 1200 has a concave notch 1210 at either end and the first groove 1130 has a protrusion 1180 corresponding to the notch 1210 therein. Some embodiments may include the spring rails 1200 that are inlaid or embedded to the body portion 1110 of the wiper rubber 1100 in the longitudinal direction.

The lever assembly 2000 holds the wiper rubber assembly 1000 (i.e., the wiper rubber 1100 with the spring rails 1200 are fitted thereto) and supports the wiper rubber assembly 1000 with respect to the wiper arm. The wiper arm is coupled to a rotating shaft of a wiper motor at its base end and is oscillated by the wiper motor. The wiper blade 100 is separably attached to the distal end of the wiper arm via the connector assembly 3000, which is separably mounted to the lever assembly 2000. The wiper blade 100 wipes the surface of the windshield while sliding thereon through oscillation motions of the wiper arm. In this embodiment, the lever assembly 2000 includes the following: a first lever 2100 centrally located; a pair of second levers 2200L, 2200R connected to the longitudinal outer ends of the first lever 2100 respectively; and a pair of third levers 2300L, 2300R connected to the longitudinal inner ends of the second levers 2200L, 2200R respectively. The levers are made by pressing a metallic sheet or injection-molding a plastic material.

The lever assembly 2000 of the wiper blade 100 according to this embodiment includes a pair of spoilers 2500L, 2500R, which produce a reaction force preventing the lift caused by wind or air stream. A left spoiler 2500L and a right spoiler 2500R, which constitute the pair of the spoilers 2500L, 2500R, are symmetrical about the longitudinal center of the lever assembly 2000 and extend in the longitudinal direction of the lever assembly 2000.

Figure 4:
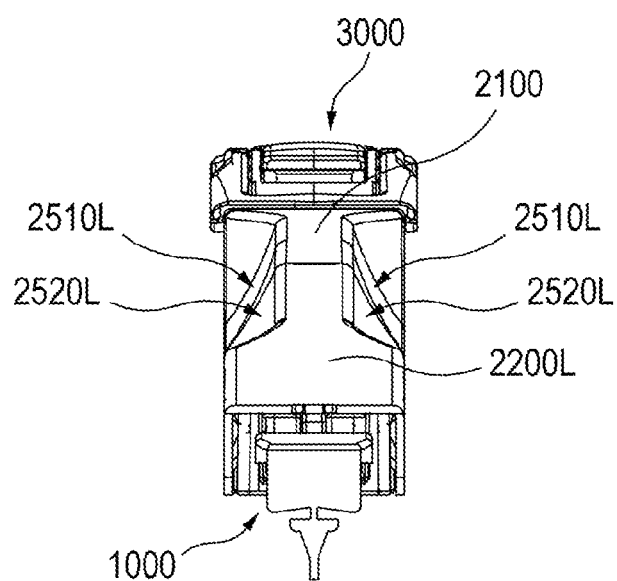
FIG. 4 is a left side view of the wiper blade shown in FIG. 1.
Figure 11:
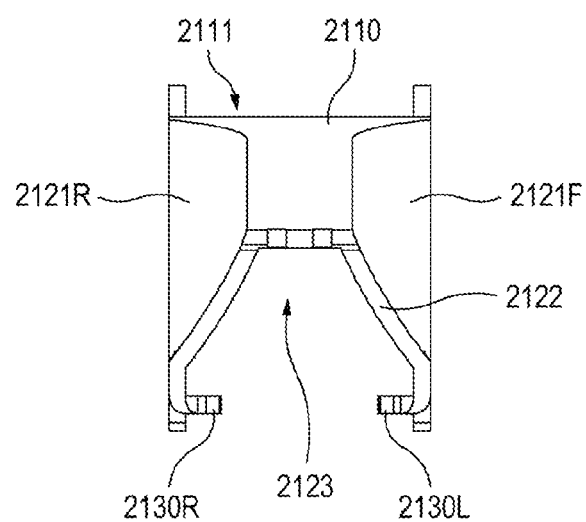
FIG. 11 is a right side view of the first lever shown in FIG. 8.
Figure 12:
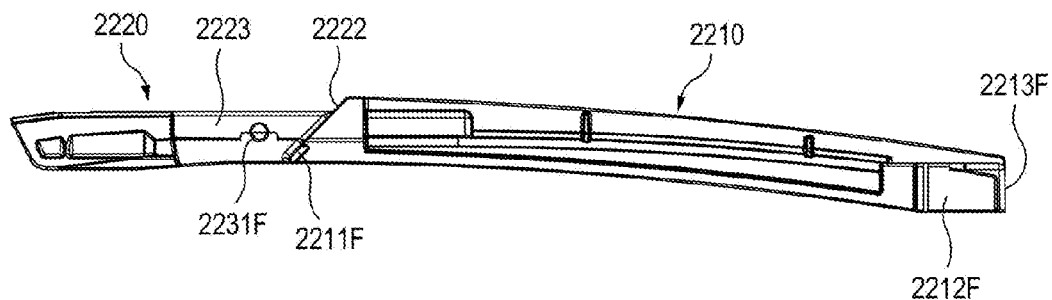
FIG. 12 is a front view showing a second lever of the lever assembly.
Figure 13:
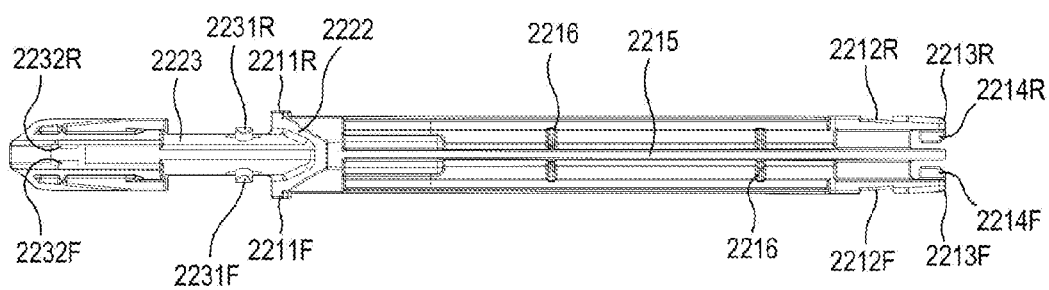
FIG. 13 is a top view of the second lever shown in FIG. 12.
Figure 14:
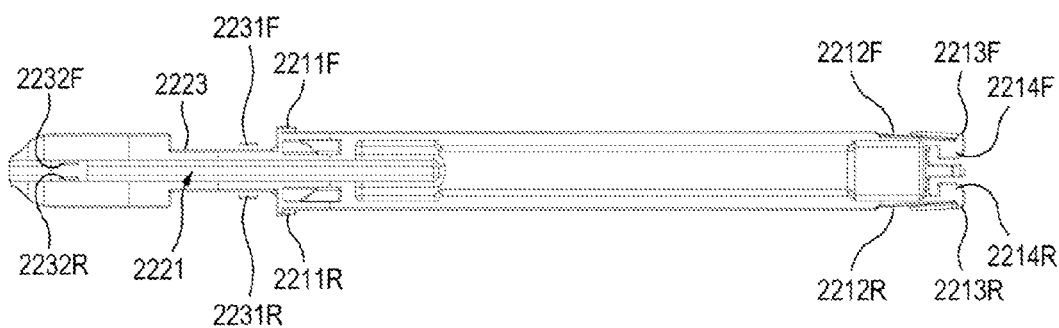
FIG. 14 is a bottom view of the second lever shown in FIG. 12.
Figure 15:
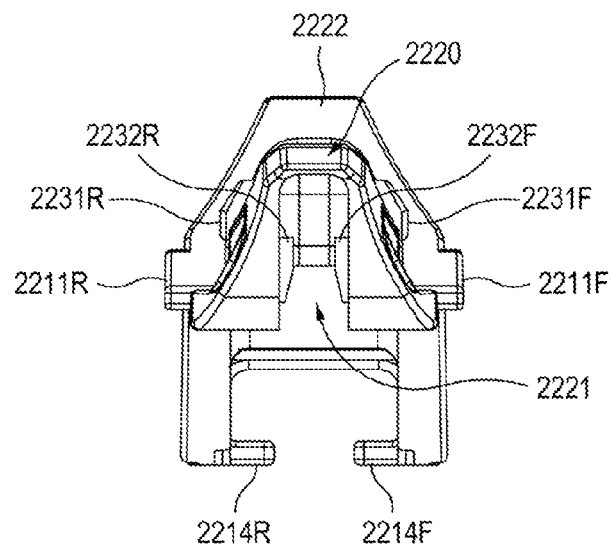
FIG. 15 is a left side view of the second lever shown in FIG. 12.
Figure 18:
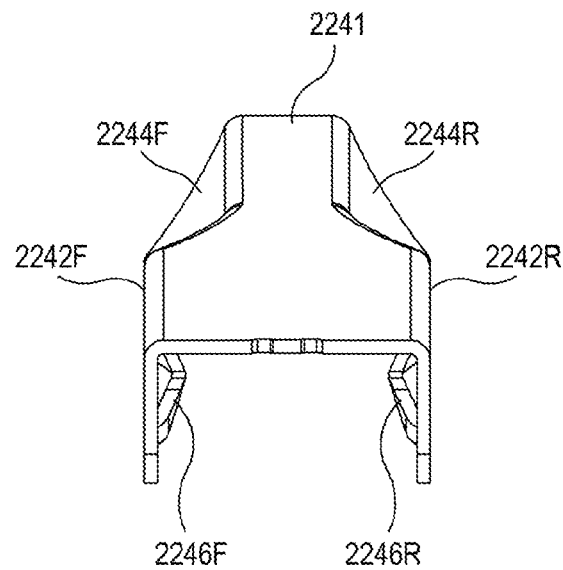
FIG. 18 is a right side view of the spoiler cover shown in FIG. 16.

Referring to FIGS. 1 to 4, in the wiper blade 100 of this embodiment, portions of the lateral surfaces of the lever assembly 2000 form the spoiler 2500L, 2500R. Each spoiler 2500L, 2500R reacts to wind or air stream impinging against the wiper blade 100 during running of a motor vehicle and produces a reaction force preventing the wiper blade 100 from being lifted. Such a reaction force is produced by interaction between wind or air stream and a cross-sectional contour shape of the lever assembly 2000 forming the spoiler 2500L, 2500R. In this embodiment, as shown in FIGS. 4, 11 and 18, the cross-sectional contour shape of the spoiler 2500L, 2500R includes a pair of concave curves that are symmetrical in the width direction of the lever assembly 2000.

Since the second levers 2200L, 2200R are connected to the respective longitudinal outer ends of the first lever 2100 in the lever assembly 2000, each longitudinal half of the lever assembly 2000 has the symmetrical configuration. Each spoiler 2500L, 2500R comprises partial spoilers located in the first lever 2100 and the second levers 2200L, 2200R. The partial spoilers of each lever are straight adjoined one after another, thereby defining the spoiler 2500L, 2500R of the wiper blade 100. In the disclosure below discussing the wiper blade 100 according to the embodiment, regarding the spoiler 2500L, 2500R integrally formed in the lever assembly 2000, a partial spoiler integrated in the first lever 2100 to become a part of the spoiler 2500L, 2500R is referred to as a first partial spoiler 2510L, 2510R, while a partial spoiler integrated in the second lever 2200L, 2200R to become another part of the spoiler 2500L, 2500R is referred to as a second partial spoiler 2520L, 2520R.

The first lever 2100 is centrally located in the lever assembly 2000. The connector assembly 3000 for connection to a wiper arm is separably coupled to the first lever 2100. Referring to FIGS. 5 and 8 to 11, the first lever 2100 has a top wall 2110 and a pair of lateral walls 2120F, 2120R. Further, the first lever 2100 has an insertion opening 2111, to which a part of the connector assembly 3000 is inserted and fixed, in the middle of the top wall 2110. When viewing the first lever 2100 from the front, the lower edge of the first lever 2100 is straight or upwardly curved with slight curvature. Further, when viewing the first lever 2100 from the front, the height of the lateral wall 2120F, 2120R gradually decreases towards the distal end of the first lever 2100.

The first lever 2100 has a pair of first inclined surfaces 2121F, 2121R in the lateral walls of its right and left sides. The first inclined surface 2121F, 2121R extends from the vicinity of the longitudinal end of the insertion opening 2111 up to the longitudinal outer end of the first lever 2100 and is inclined inwardly of the first lever 2100 in the width direction of the first lever 2100. Thus, when viewing the first lever 2100 from the side, the first lever 2100 has an inverted V-shaped cross-section. Accordingly, the first partial spoiler 2510L, 2510R is integrated in the first lever 2100 through the first inclined surfaces 2121F, 2121R. The width of the top wall 2110 becomes sharply narrow from the insertion opening 2111 and is then constant. The first inclined surfaces 2121F, 2121R are concave in harmony with such a width of the top wall 2110. Thus, the cross-sectional contour shape of the first partial spoiler 2510L, 2510R, which the first inclined surfaces 2121F, 2121R define, includes a pair of concave curves that are symmetrical in the width direction of the first lever 2100. When viewing the first lever from the side or through a cross section, the first inclined surface 2121F, 2121R includes a concave curved surface.

The insertion opening 2111 is perforated in the top wall 2110 in an approximate rectangular shape. A rivet 2141 is joined to the lateral walls 2120F, 2120R below the insertion opening 2111. The rivet 2141 is used for connection between the first lever 2100 and the connector assembly 3000. A part of the connector assembly 3000, which is configured to be connected to a coupling element provided at the distal end of the wiper arm through fitting, snapping, engaging, etc., may be coupled to the rivet 2141. The rivet 2141 functions as a rotating shaft of the wiper blade 100 with respect to the wiper arm, when the wiper blade 100 is connected to the wiper arm. A positioning notch 2112 is formed in an edge of the insertion opening 2111. When said part of the connector assembly 3000 is inserted to the insertion opening 2111, the notch 2112 assists in positioning said part. Further, through holes, which are used for connection to a wiper arm, are formed in the lateral walls 2120F, 2120R below the insertion opening 2111. Specifically, a pair of first through holes 2142 are perforated near the rivet in the respective lateral walls 2120F, 2120R in the width direction of the first lever 2100. Further, in the respective lateral walls 2120F, 2120R, a pair of second through holes 2143 are perforated near the rivet 2141 in the opposite side to the first through hole 2142 in the width direction of the first lever 2100. The second through hole 2143 is smaller than the first through hole 2142.

When viewing the first lever 2100 from the front, the upper length of the first lever 2100 is longer than the lower length. Thus, each of the longitudinal outer ends of the first lever 2100 is formed with an end surface 2122, which is inclined at an acute angle to the upper edge and at an obtuse angle to the lower edge, i.e., inclined towards the distal end of the lever assembly 2000 (towards the longitudinal outer end of the second lever 2200L, 2200R). Further, the first lever 2100 has an element for fitting in the longitudinal direction to a lever joint (discussed below). In this embodiment, the fitting element of the first lever 2100 includes a pair of fitting protrusions 2130L, 2130R that are located in the respective longitudinal outer ends of the first lever 2100 and protrude inwardly from the lower end or edges of the first lever 2100. The fitting protrusions 2130L, 2130R are adjoined to the end surface 2122. The fitting protrusions 2130L, 2130R may be formed by bending a portion of the lower edge of the first lever 2100, which is adjacent to the end surface 2122, inwardly of the first lever 2100. The fitting protrusions 2130L, 2130R extend in the longitudinal direction of the lever assembly 2000 or the first lever 2100. A cutout 2131 is formed in the middle of the fitting protrusion 2130L, 2130R.

When the first lever 2100 and the second lever 2200L, 2200R are connected to each other, a portion of the second lever 2200L, 2200R is situated in a lever receiving portion 2123 defined between the lateral walls 2120F, 2120R of the first lever 2100.

Each second lever 2200L, 2200R is connected to the first lever 2100 and holds the wiper rubber assembly 1000. Descriptions are made as to the second lever 2200R with reference to FIGS. 5 and 12 to 19. The second lever 2200L is symmetrical with the second lever 2200R in the longitudinal direction of the lever assembly 2000.

The second lever 2200L, 2200R extends approximately straight. The second lever 2200L, 2200R includes an arm portion 2210 and a joint portion 2220. When the first lever 2100 and the second lever 2200L, 2200R are assembled together, the joint portion 2220 is situated in the lever receiving portion 2123 of the first lever 2100 and the arm portion 2210 oppositely extends from the joint portion 2220. The joint portion 2220 has a longitudinally extending lever receiving groove 2221 therein. A stepped surface 2222 is formed at the boundary between the arm portion 2210 and the joint portion 2220. The stepped surface 2222 is positioned opposite the end surface 2122 of the first lever 2100 and is inclined towards the distal end of the lever assembly 2000 (towards the longitudinal outer end of the second lever 2200L, 2200R). That is, the upper length between the longitudinal outer end and the stepped surface 2222 in the second lever 2200L, 2200R is shorter than the lower length between the longitudinal outer end and the stepped surface 2222.

The joint portion 2220 of the second lever 2200L, 2200R has a joint seat 2223, on which the lever joint is seated, longitudinally inward of the stepped surface 2222. The second lever 2200L, 2200R includes fitting protrusions 2231F, 2231R for hinge-joint to the lever joint, in the outer surface of the joint seat 2223. The fitting protrusions 2231F, 2231R protrude in a width direction orthogonal to the longitudinal direction of the lever assembly 2000 or the second lever 2200L, 2200R. The fitting protrusion 2231F, 2231R has a beveled surface at an upper portion of its tip end. Further, the second lever 2200L, 2200R includes a pair of fitting protrusions 2232F, 2232R, which protrude inwardly from the inner surface of the lever receiving groove 2221 of the joint portion in the width direction of the second lever, in the vicinity of its longitudinal inner end. The fitting protrusions 2232F, 2232R participate in hinge-joint to the third lever 2300L, 2300R. The fitting protrusion 2232F, 2232R has a beveled surface at a lower portion of its tip end.

A spoiler cover 2240L, 2240R of the lever assembly 2000 is separably coupled to or longitudinally integrated in a portion of the second lever 2200L, 2200R (e.g., the arm portion 2210). In the example shown in FIGS. 16 to 18, the spoiler cover 2240L, 2240R is separably coupled to the arm portion 2210 of the second lever 2200L, 2200R. The spoiler cover 2240L, 2240R is disposed between the longitudinal outer end of the first lever 2100 and the longitudinal outer end of the second lever 2200L, 2200R. By way of example, the spoiler cover 2240L, 2240R is coupled to the arm portion 2210 by snap engagement by fitting the longitudinal inner end of the spoiler cover 2240L, 2240R to the longitudinal inner end of the arm portion 2210 and then pressing the longitudinal outer end of the spoiler cover 2240L, 2240R on the longitudinal outer end of the arm portion 2210. For such snap engagement, the arm portion 2210 includes engagement lugs 2211F, 2211R formed in the longitudinal inner end, and concavities 2212F, 2212R and stoppers 2213F, 2213R, which are formed in the longitudinal outer end.

The engagement lugs 2211F, 2211R are located adjacent to the stepped surface 2222 and protrude outwardly. The concavities 2212F, 2212R are located in the longitudinal outer end of the arm portion 2210 and become deeper towards the longitudinal outer end, thereby forming the L-shaped stoppers 2213F, 2213R at the longitudinal outer end of the arm portion 2210. The engagement lugs 2211F, 2211R are fitted to notches of the spoiler cover 2240L, 2240R, while dents of the spoiler cover 2240L, 2240R snap-engages the concavities 2212F, 2212R.

Further, the arm portion 2210 includes a pair of fingers 2214F, 2214R for grasping the wiper rubber assembly 1000, at the lower edge of the longitudinal outer end. The fingers 2214F, 2214R are adjacent to the concavities 2212F, 2212R and protrude inwardly from the lower edge of the arm portion 2210. When the second lever 2200L, 2200R and the wiper rubber assembly 1000 are assembled, the tip ends of the fingers 2214F, 2214R of the second lever 2200L are fitted to the insertion hole 1170 of the wiper rubber 1100 along the second groove 1140. Further, the tip ends of the fingers 2214F, 2214R of the second lever 2200R are inserted to the second groove 1140 of the wiper rubber 1100. Then, the spring rails 1200 and a portion of the wiper rubber 1100 adjacent thereto are sandwiched between the fingers 2214F, 2214R and the underside of the arm portion 2210 located over the fingers 2214F, 2214R. Further, the arm portion 2210 has a longitudinal rib 2215 and a plurality of transvers ribs 2216 intersecting the longitudinal rib 2215.

Figure 16:
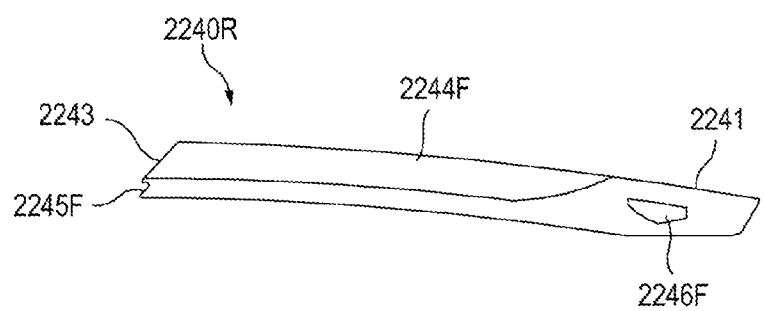
FIG. 16 is a front view showing a spoiler cover of the second lever.
Figure 17:
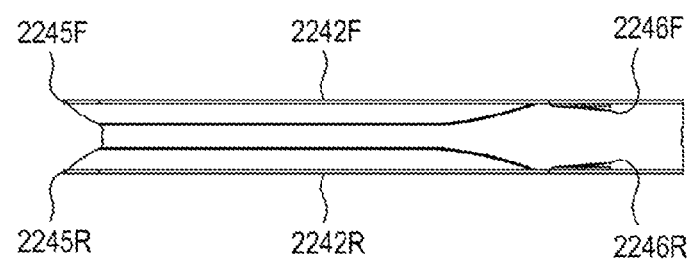
FIG. 17 is a bottom view of the spoiler cover shown in FIG. 16.

The second partial spoiler 2520L, 2520R is integrated in the spoiler cover 2240L, 2240R. Referring to FIGS. 16 to 18, the spoiler cover 2240L, 2240R has a top wall 2241 and a pair of lateral walls 2242F, 2242R. When viewing the spoiler cover 2240L, 2240R from front, the upper and lower edges of the spoiler cover 2240L, 2240R are upwardly curved with slight curvature. Further, when viewing the spoiler cover 2240L, 2240R from the front, the upper length of the spoiler cover 2240L, 2240R is shorter than the lower length. Thus, the longitudinal inner end of the spoiler cover 2240L, 2240R is formed with an end surface 2243 that is inclined towards the distal end of the lever assembly 2000 (towards the longitudinal outer end of the second lever 2200L, 2200R).

The spoiler cover 2240L, 2240R has a pair of second inclined surfaces 2244F, 2244R in its lateral walls. The second inclined surfaces 2244F, 2244R extend from the end surface 2243 up to the longitudinal outer end of spoiler cover 2240L, 2240R and are inclined inwardly of the spoiler cover in the width direction of the spoiler cover 2240L, 2240R. Thus, when viewing the spoiler cover 2240L, 2240R from the side, the spoiler cover 2240L, 2240R has an inverted V-shaped cross-section. Accordingly, the second partial spoiler 2520L, 2520R is integrated in the spoiler cover 2240L, 2240R through the second inclined surfaces 2244F, 2244R. The width of the top wall 2241 is constant in the longitudinal direction from the end surface 2243 within a predetermined length and then becomes broad. The second inclined surfaces 2244F, 2244R are concave in harmony with such a width of the top wall 2241. Thus, the cross-sectional contour shape of the second partial spoiler 2520L, 2520R, which the second inclined surfaces 2244F, 2244R define, includes a pair of concave curves that are symmetrical in the width direction of the spoiler cover 2240L, 2240R (in the width direction of the second lever 2200L, 2200R). When viewing the second lever 2200L, 2200R (or the spoiler cover 2240L, 2240R) from the side or through a cross section, the second inclined surface 2244F, 2244R includes a concave curved surface.

Figure 19:
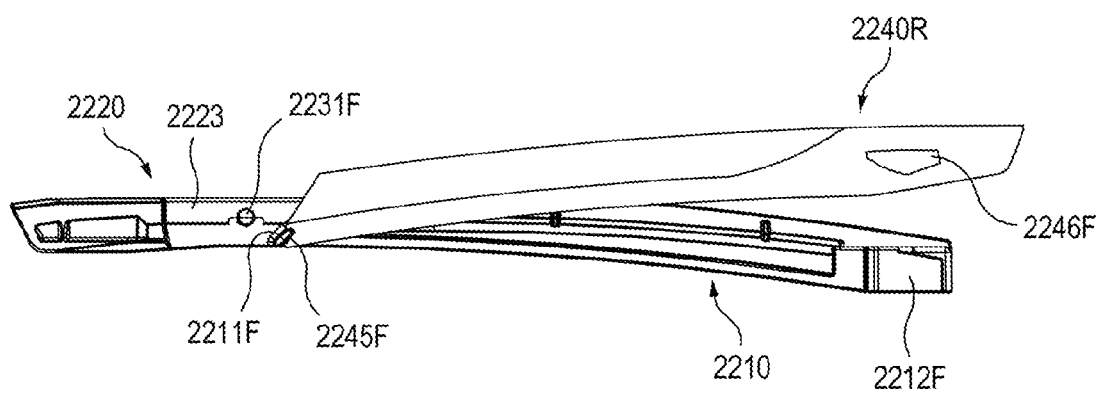
FIG. 19 shows an assembly example between the spoiler cover and the second lever.

The spoiler cover 2240L, 2240R has a pair of notches 2245F, 2245R, to which the engagement lugs 2211F, 2211R of the second lever 2200L, 2200R is fitted, below the end surface 2243. Further, the spoiler cover 2240L, 2240R has a pair of inwardly protruding dents 2246F, 2246R in the vicinity of the longitudinal outer end. The pair of dents 2246F, 2246R are formed in the position corresponding to the concavities 2212F, 2212R of the second lever 2200L, 2200R. As shown in FIG. 19, the spoiler cover 2240L, 2240R is coupled to the second lever 2200L, 2200R in such a manner that the engagement lugs 2211F, 2211R are fitted to the notches 2245F, 2245R as the spoiler cover 2230L, 2240R slightly tilts, and then the dents 2246F, 2246R snap-engage the concavities 2212F, 2212R by pressing the longitudinal outer end of the spoiler cover to the second lever 2200L, 2200R. If the spoiler cover 2240L, 2240R is coupled to the second lever 2200L, 2200R, then the ends of the dents 2246F, 2246R engages with the stoppers 2213F, 2213R of the second lever 2200L, 2200R and, thus, the spoiler cover 2240L, 2240R is not separated longitudinally outwardly from the second lever 2200L, 2200R.

Figure 5:
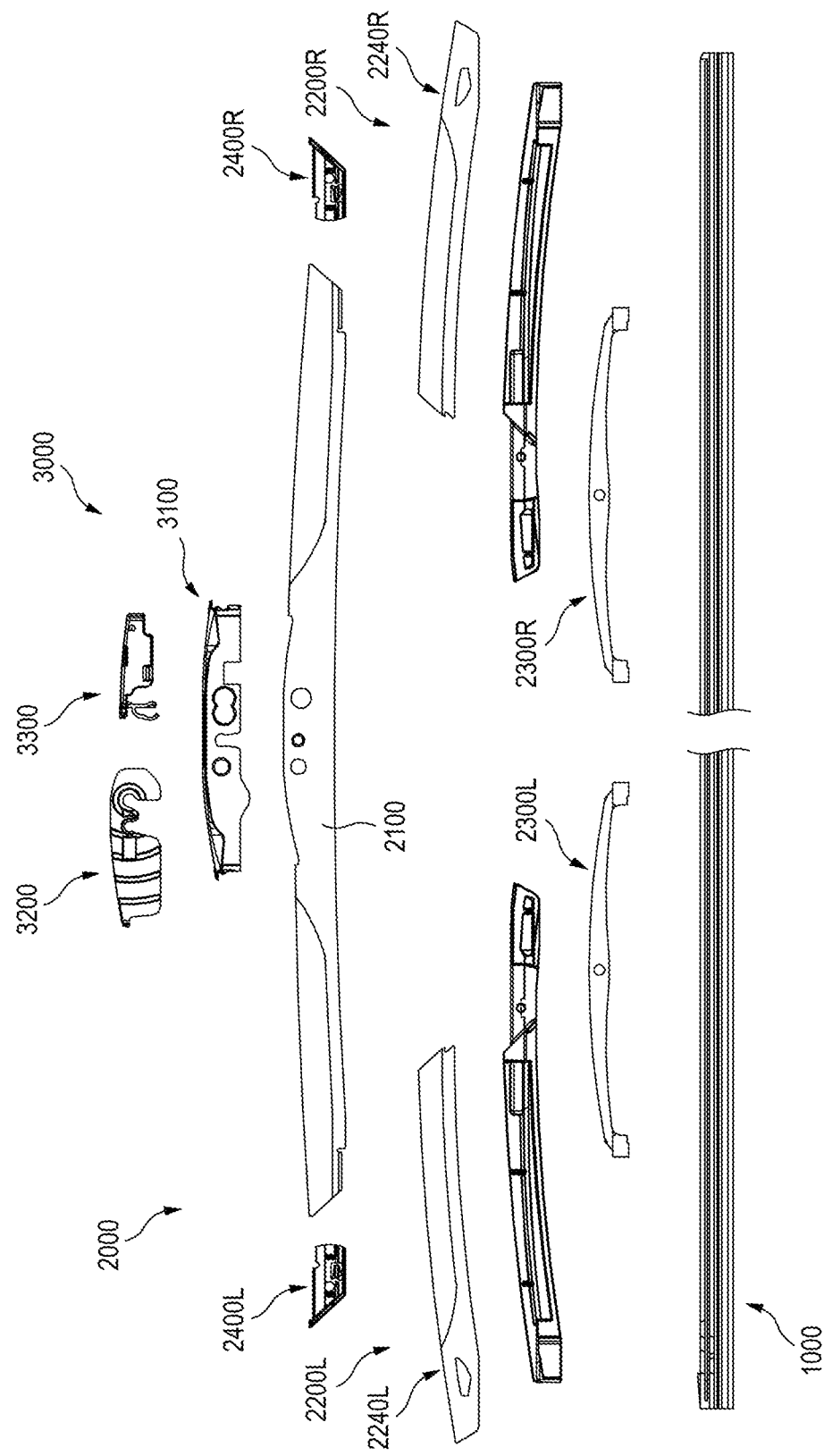
FIG. 5 is an exploded front view of the wiper blade shown in FIG. 1.
Figure 20:
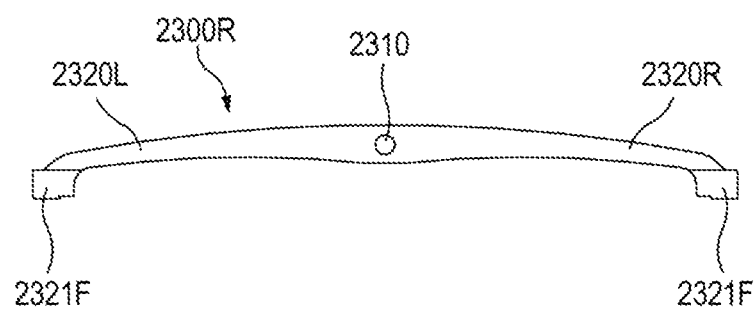
FIG. 20 is a front view showing a third lever of the lever assembly.
Figure 21:
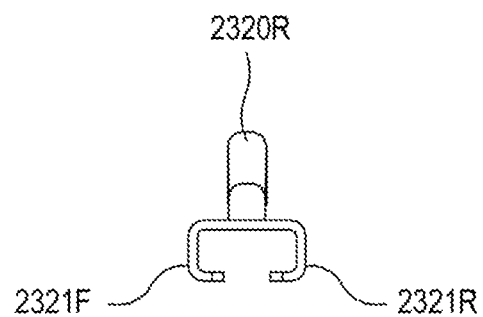
FIG. 21 is a right side view of the third lever shown in FIG. 20.
Figure 22:
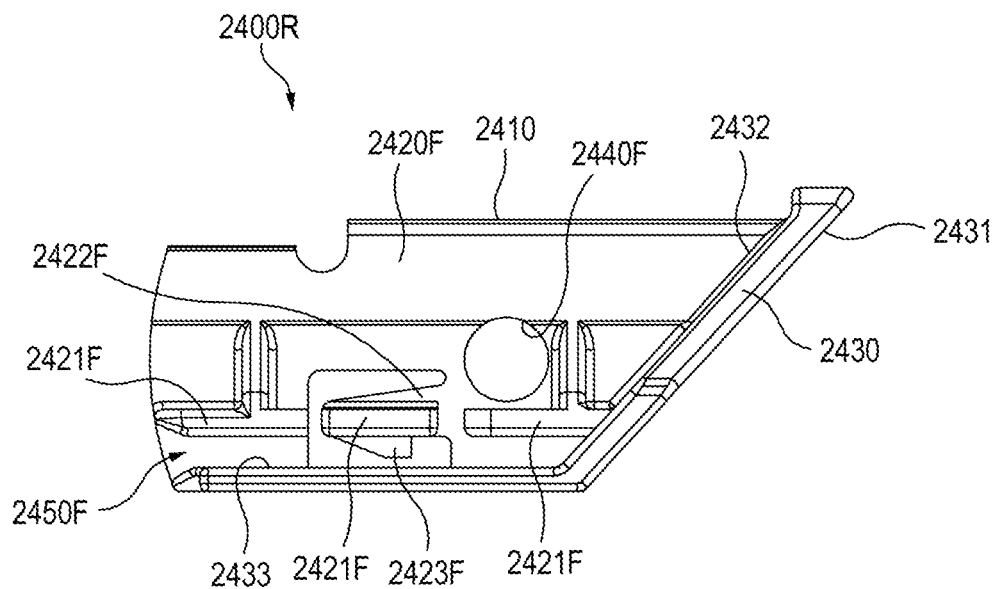
FIG. 22 is a front view showing a lever joint of the lever assembly.
Figure 23:
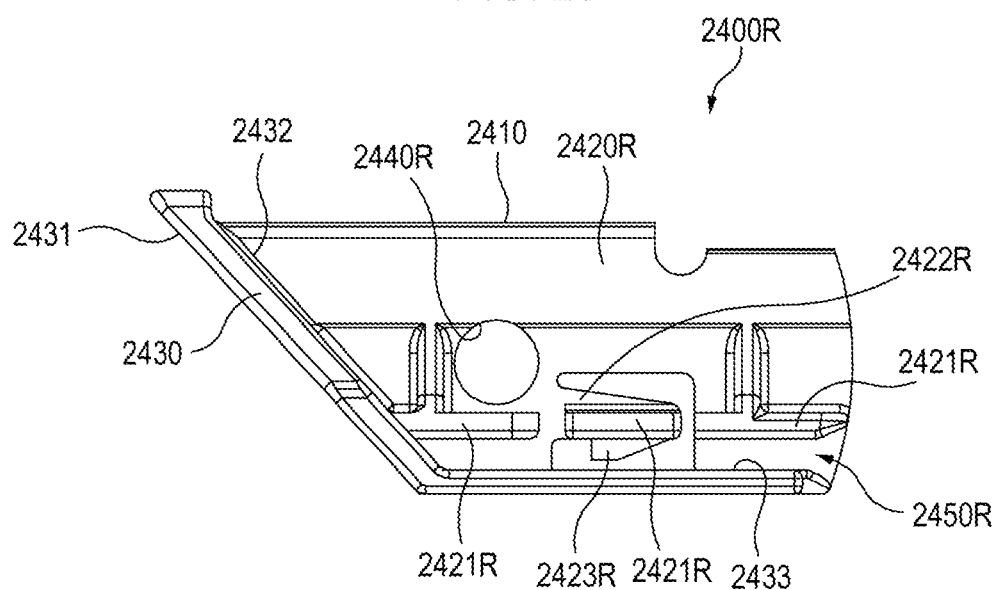
FIG. 23 is a rear view of the lever joint shown in FIG. 22.
Figure 24:
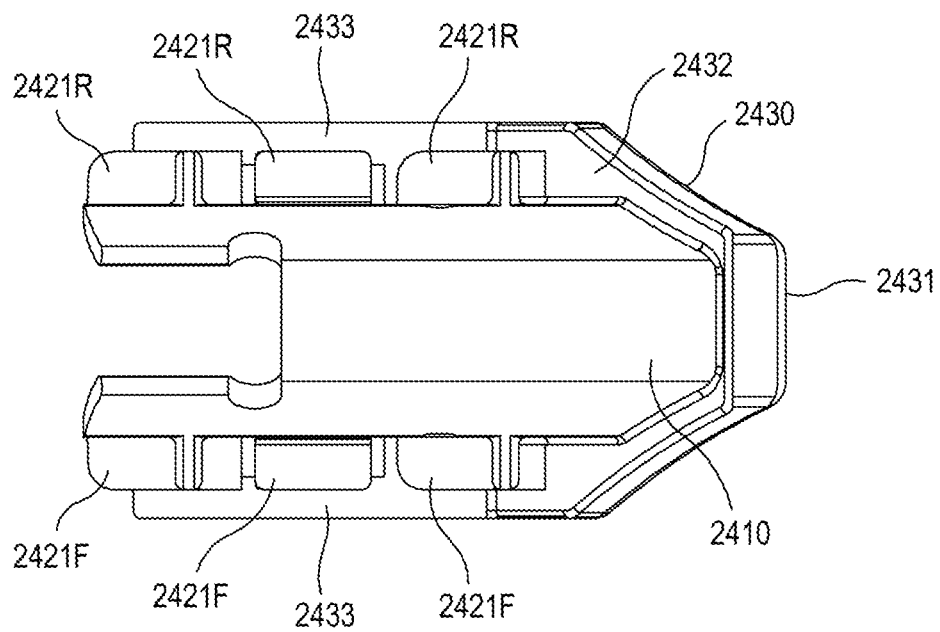
FIG. 24 is a top view of the lever joint shown in FIG. 22.
Figure 25:
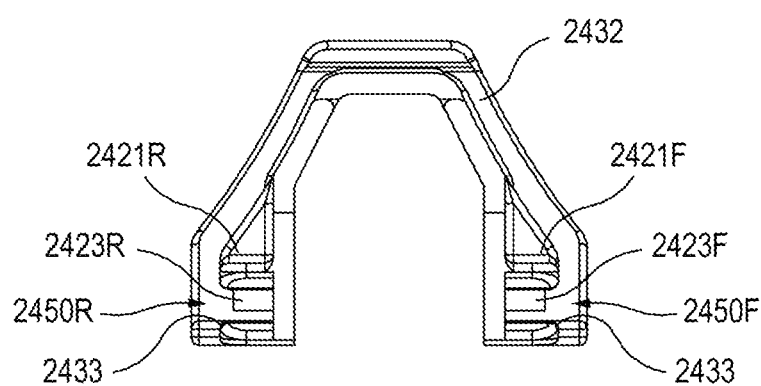
FIG. 25 is a left side view of the lever joint shown in FIG. 22.

The third lever 2300L, 2300R is hinge-jointed to the joint portion 2220 of the second lever 2200L, 2200R. Referring to FIGS. 5, 20 and 21, the third lever 2300L, 2300R has an inverted U-shaped cross section and includes a pair of arms 2320L, 2320R extending from a central fitting hole 2310 in opposite directions. The second lever 2200L, 2200R and the third lever 2300L, 2300R are hinge-jointed to each other through fitting of protrusions and holes. In other words, the fitting protrusions 2232F, 2232R formed inside the joint portion 2220 of the second lever 2200L, 2200R are fitted to the fitting hole 2310 of the third lever 2300L, 2300R, thereby rotatably connecting the third lever 2300L, 2300R to the second lever 2200L, 2200R. When the third lever 2300L, 2300R is connected to the second lever 2200L, 2200R, the arm 2320L of the third lever is positioned in the lever receiving groove 2221 of the second lever 2200L, 2200R and the arm 2320R of the third lever is positioned in the lever receiving portion 2123 of the first lever 2100.

The respective distal ends of the arms 2320L, 2320R of the third lever 2300L, 2300R are provided with a pair of fingers 2321F, 2321R grasping the wiper rubber assembly 1000. The fingers 2321F, 2321R have an approximately C-shape and their tip ends protrude inwardly of the arm 2320L, 2320R. When the third lever 2300L, 2300R and the wiper rubber assembly 1000 are assembled together, the fingers 2321F, 2321R are inserted to the second grooves 1140 of the wiper rubber 1100.

As described above, each lever constituting the lever assembly 2000 is hinge-jointed to a lever adjacent thereto. Thus, the adjacent two levers are rotatable relative to each other within a predetermined range via a hinge-joint portion therebetween. As described above, the second lever 2200L 2200R and the third lever 2300L, 2300R are hinge-jointed through fitting between the fitting protrusions 2232F, 2232R and the fitting hole 2310 and the third lever 2300L, 2300R is rotatable relative to the second lever 2200L, 2200R within a predetermined range. Further, the second lever 2200L, 2200R is hinge-jointed to the longitudinal outer end of the first lever 2100. In the embodiments disclosed herein, the lever assembly 2000 includes a lever joint 2400L, 2400R for hinge-joint between the first lever 2100 and the second lever 2200L, 2200R. The lever joint 2400L, 2400R is laid on the outer surface of the second lever 2200L, 2200R and is located under the inner surface of the first lever 2100, rotatably interconnecting the first and second levers. That is, the lever joint 2400L, 2400R is interposed between the inner surface of the first lever 2100 and the outer surface of the second lever 2200L, 2200R. When the first lever 2100 and the second lever 2400L, 2400R are coupled via the lever joint 2400L, 2400R, most of the lever joint 2400L, 2400R does not appear outwardly in the lever assembly 2000.

Descriptions are made as to the lever joint 2400L, 2400R with reference to FIGS. 5 and 22 to 25. The lever joint 2400L, 2400R has an approximately inverted V-shaped cross section. The lever joint 2400L, 2400R has a top wall 2410 and a pair of lateral walls 2420F, 2420R. The joint seat 2223 of the second lever 2200L, 2200R is inserted to the space defined between the top wall 2410 and the lateral walls 2420F, 2420R. The lever joint 2400L, 2400R has a flange portion 2430 that is formed along a longitudinal outer end and a lower edge of the lever joint. The surface of the longitudinal outer end of the lever joint 2400L, 2400R (i.e., the longitudinal outer surface 2431 of the flange portion 2430) is inclined towards the distal end of the lever assembly 2000 (towards the longitudinal outer end of the second lever 2200L, 2200R), forming an inclined end surface. That is, the upper length between the longitudinal inner end of the lever joint 2400L, 2400R and the outer surface 2431 of the flange portion 2430 is longer than the lower length. The lever joint 2400L, 2400R can contact the stepped surface 2222 of the second lever 2200L, 2200R at the longitudinal outer surface 2431 of the flange portion 2430. The lever joint 2400L, 2400R is assembled to the second lever 2200L, 2200R with a slight clearance between the outer surface 2431 of the flange portion 2430 and the stepped surface 2222 of the second lever 2200L, 2200R. Thus, the lever joint 2400L, 2400R is rotatable relative to the second lever 2200L, 2200R within the range permitted by said clearance. When the lever joint 2400L, 2400R is assembled to the first lever 2100, the lever joint 2400L, 2400R contacts the end surface 2122 of the first lever 2100 at the longitudinal inner surface 2432 of the flange portion 2430.

Figure 26:
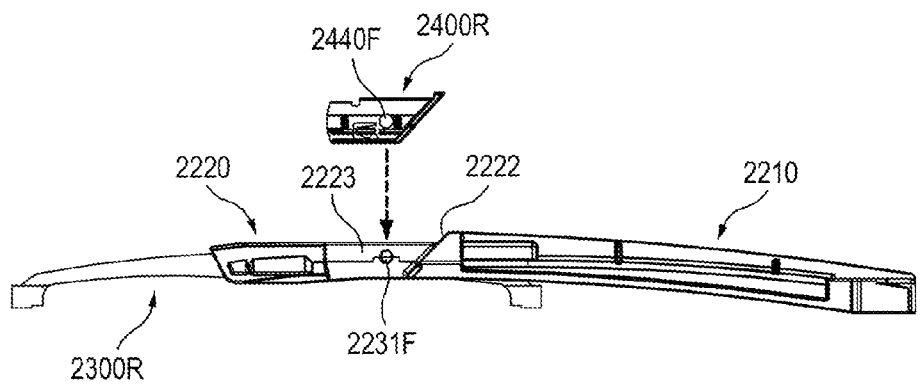
FIG. 26 shows an assembly example between the lever joint and the second lever.

The lever joint 2400L, 2400R has fitting holes 2440F, 2440R perforated in the respective lateral walls 2420F, 2420R. As shown in FIG. 26, the lever joint 2400L, 2400R is rotatably coupled to the second lever 2200L, 2200R by fitting the fitting protrusions 2231F, 2231R formed in the joint seat 2223 of the second lever 2200L, 2200R to the fitting holes 2440F, 2440R of the lever joint 2400L, 2400R. For example, coupling between the lever joint 2400L, 2400R and the second lever 2200L, 2200R can be done by positioning the lever joint 2400L, 2400R on the joint seat 2223 of the second lever, and then vertically pushing the lever joint 2400L, 2400R towards the joint seat 2223, thereby bringing the fitting protrusions 2231F, 2231R into snap engagement with the fitting holes 2440F, 2440R.

Figure 27:
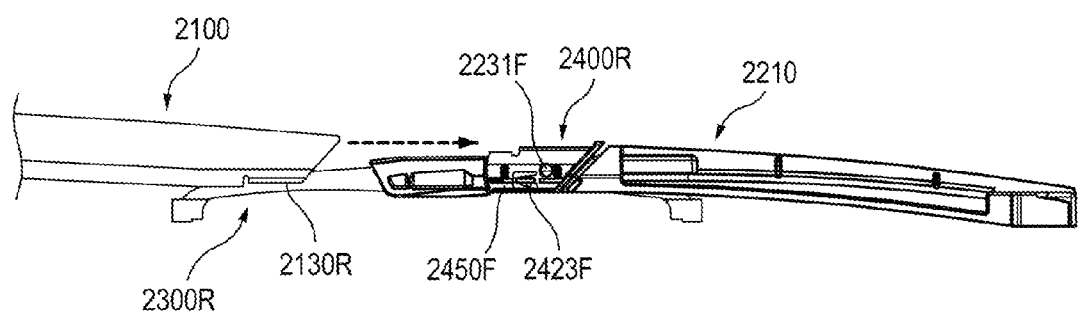
FIG. 27 shows an assembly example between the lever joint and the first lever.
Figure 28:
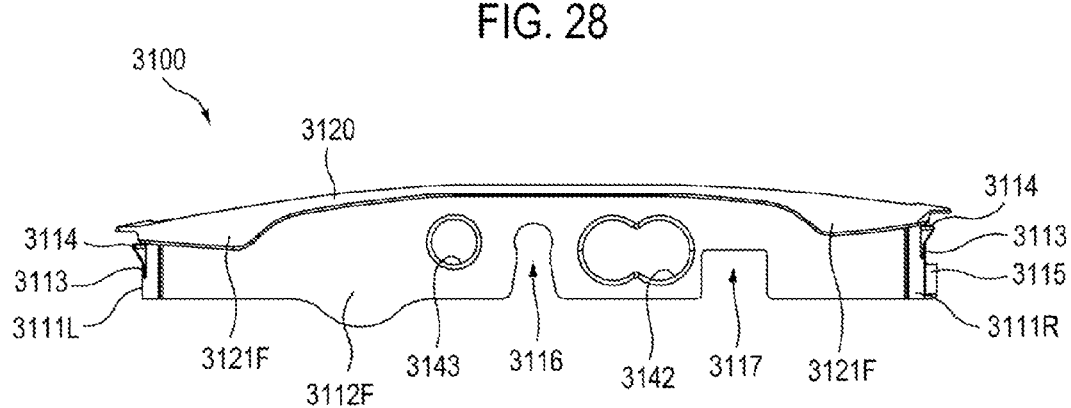
FIG. 28 is a front view showing a bracket of a connector assembly.
Figure 29:
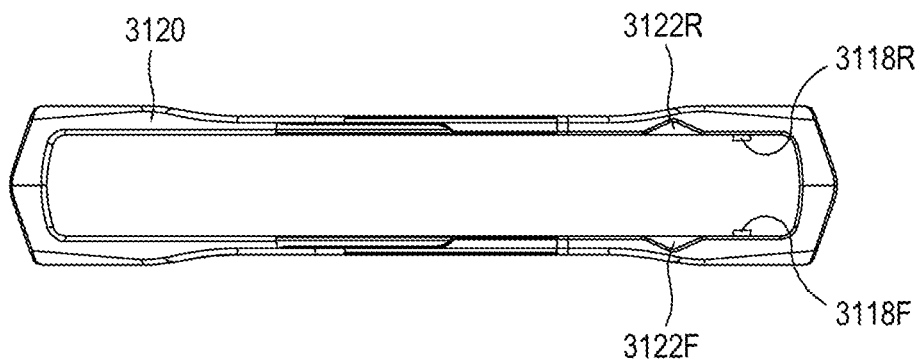
FIG. 29 is a top view of the bracket shown in FIG. 28.
Figure 30:
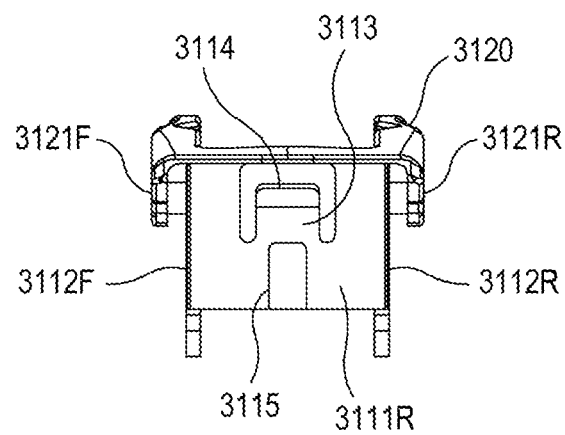
FIG. 30 is a right side view of the bracket shown in FIG. 28.
Figure 31:
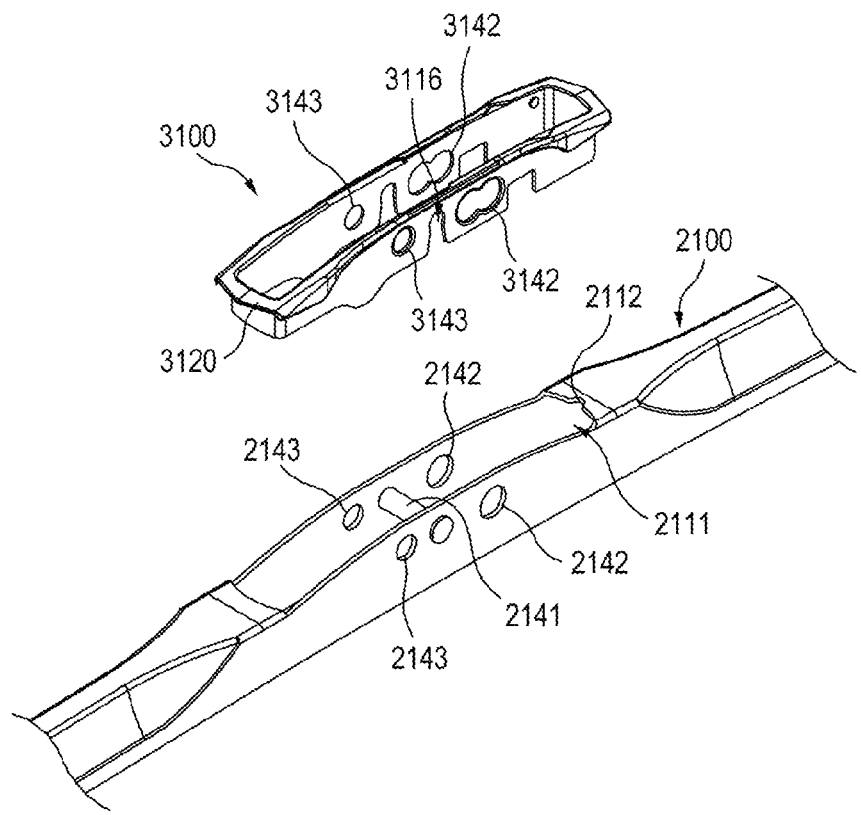
FIG. 31 shows an assembly example between the first lever of the lever assembly and the bracket of the connector assembly.
Figure 32:
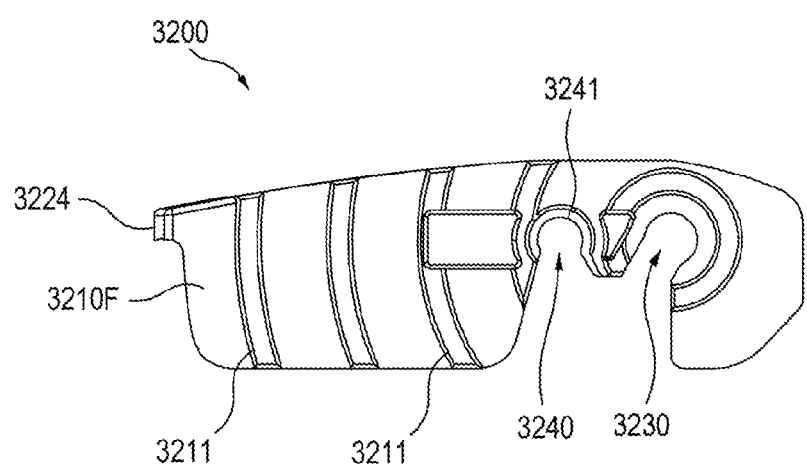
FIG. 32 is a front view showing an adaptor of the connector assembly.
Figure 33:
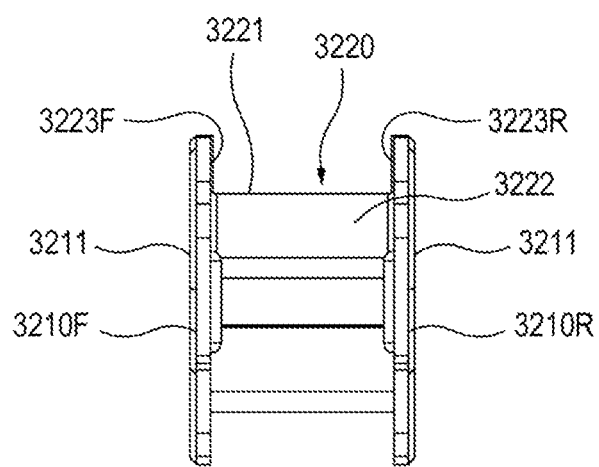
FIG. 33 is a right side view of the adaptor shown in FIG. 32.
Figure 34:
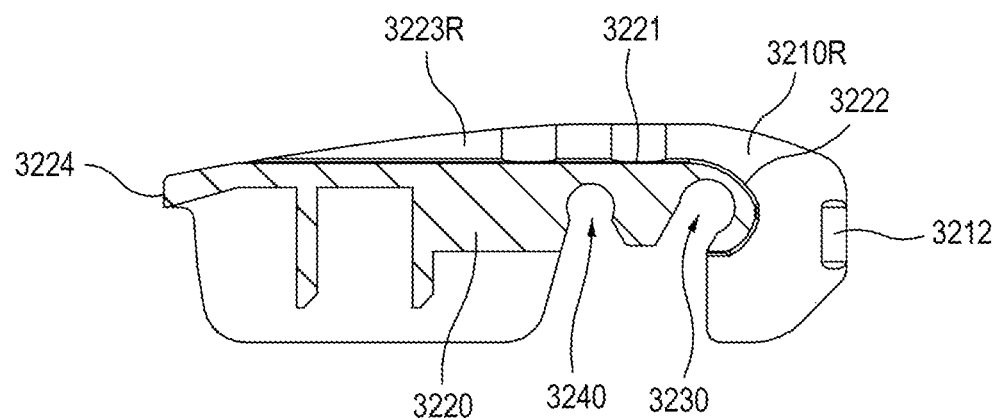
FIG. 34 is a longitudinal sectional view of the adaptor shown in FIG. 32.
Figure 35:
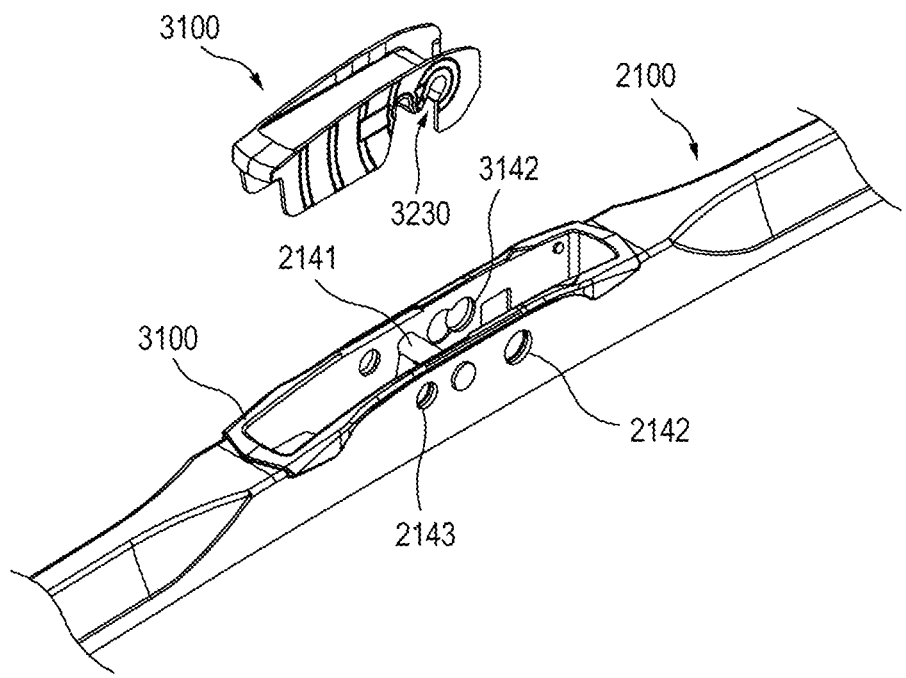
FIG. 35 shows an assembly example between the bracket and the adaptor.
Figure 36:
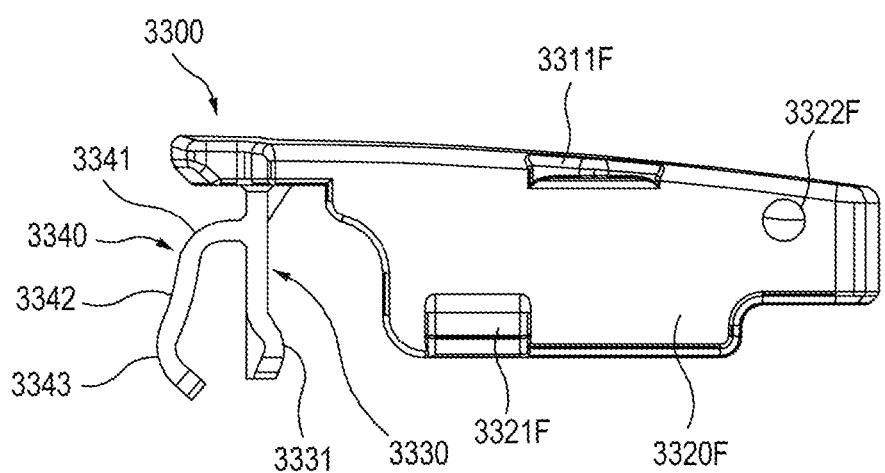
FIG. 36 is a front view showing a clamping cover of the connector assembly.
Figure 37:
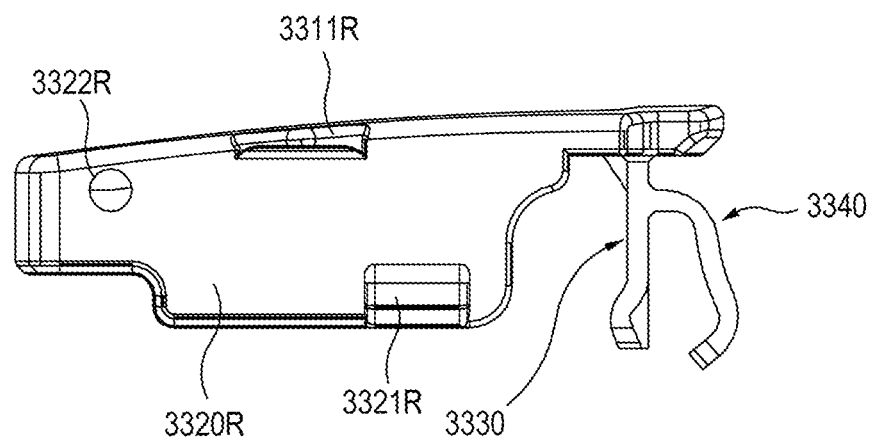
FIG. 37 is a rear view of the clamping cover shown in FIG. 36.
Figure 38:
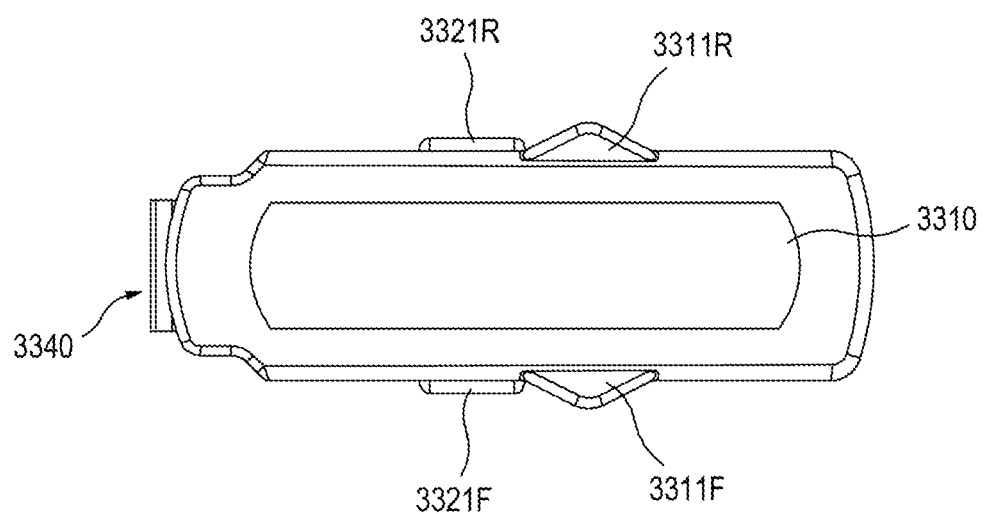
FIG. 38 is a top view of the clamping cover shown in FIG. 36.
Figure 39:
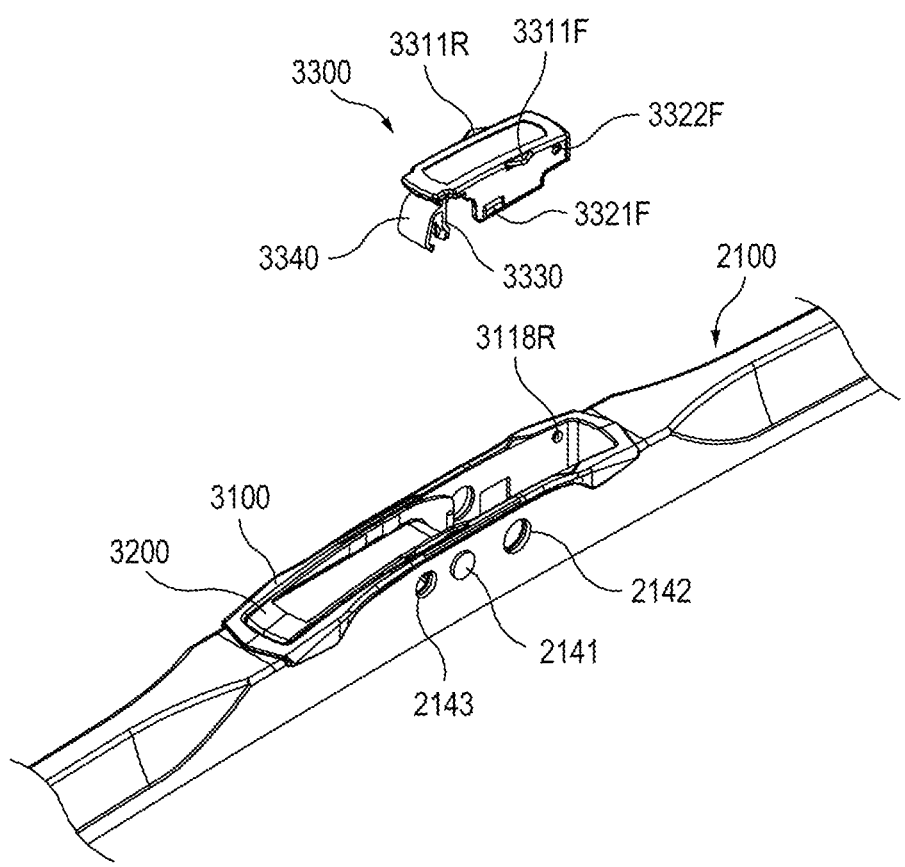
FIG. 39 shows an assembly example between the bracket and the clamping cover.

As shown in FIG. 27, the lever joint 2400L, 2400R is fitted to the first lever 2100 through insertion in the longitudinal direction of the lever assembly 2000 (or in the longitudinal direction of the first lever 2100). For this end, the lever joint 2400L, 2400R includes a pair of fitting grooves 2450F, 2450R, to which the fitting protrusion 2130L, 2130R of the first lever 2100 are fitted respectively. Each of the fitting grooves 2450F, 2450R extends from the longitudinal inner end towards the longitudinal outer end along the lower edge of the lever joint 2400L, 2400R (along a lower top surface 2433 of the flange portion 2430). The lever joint 2400L, 2400R has rails 2421F, 2421R, which are spaced apart from the lower edge and protrudes from the lateral wall 2420F, 2420R. The fitting groove 2450F, 2450R is defined between the rail 2431F, 2421R and the top surface 2433 of the flange portion 2430. Further, the lever joint 2400L, 2400R has a latch 2422F, 2422R in the middle of each rail 2421F, 2421R. The latch 2420F, 2420R is formed by cutting out the lateral wall 2420F, 2420R in an approximately C-shape and is elastically flexible. The latch 2422F, 2422R has a snap protrusion 2423F, 2423R, which protrudes in a shape of a wedge, at its lower end. If the lever joint 2400L, 2400R is coupled to the first lever 2100, the fitting protrusion 2130L, 2130R of the first lever 2100 is fitted to the fitting groove 2450F, 2450R of the lever joint 2400L, 2400R and the latch 2422F, 2422R engages the cutout 2131 of the fitting protrusion 2130L, 2130R in a snap manner at the snap protrusion 2423F, 2423R. Thus, the snap protrusion 2423F, 2423R of the latch 2422F, 2422R snap-engages with the cutout 2131 of the fitting protrusion 2130L, 2130R, preventing the separation of the first lever 2100 and the lever joint 2400L, 2400R in the longitudinal direction. Further, when the first lever 2100 and the lever joint 2400L, 2400R are coupled to each other, the first lever 2100 and the lever joint 2400L, 2400R can integrally rotate relative to the second lever 2200L, 2200R within a predetermined range. Further, when the first lever 2100 and the lever joint 2400L, 2400R are coupled to each other, only the longitudinal outer portion of the flange portion 2430 of the lever joint 2400L, 2400R appears in the lever assembly 2000.

The end surface 2122, which is located at the longitudinal outer end of the first lever 2100, is inclined to the distal end of the lever assembly 2000. Further, the outer surface 2431 of the flange portion 2430 of the lever joint 2400L, 2400R is inclined at approximately the same angle as the end surface 2122 of the first lever 2100 and the stepped surface 2222 of the second lever 2200L, 2200R is also inclined at approximately the same angle as said angle. Further, the flange portion 2430 of the lever joint 2400L, 2400R and the stepped surface 2222 of the second lever 2200L, 2200R are positioned with a slight clearance. Thus, when no load acts on the wiper blade 100, the first lever 2100 and the second lever 2200L, 2200R can rotate relative to each other within a range permitted by said clearance. On the contrary, when a downward load acts on the wiper blade 100 (e.g., when the wiper arm applies a force to the wiper blade toward the windshield), the outer surface 2431 of the flange portion 2430 of the lever joint 2400L, 2400R and the stepped surface 2222 of the second lever 2200L, 2200R can come into abutment with each other. In other words, with the outer surface 2431 of the flange portion 2430 of the lever joint 2400L, 2400R, which is inclined as described above, and the stepped surface 2222 of the second lever 2200L, 2200R, which corresponds to the outer surface 2431, the second lever 2200L, 2200R cannot pivot upwardly relative to the first lever 2100. Accordingly, when a downward load acts on the wiper blade 100, the lever assembly 2000 can bring the wiper rubber assembly 1000 into strong contact with the windshield along its longitudinal direction.

The wiper blade 100 according to the embodiment, which includes the above-described wiper rubber assembly 1000 and lever assembly 2000, is connected to a wiper arm through the connector assembly 3000. The wiper blade 100 according to the embodiment is applicable to either a "hook wiper arm" including a hook-shaped coupling element at its distal end or a "side pin wiper arm" including a pin-shaped coupling element at its distal end.

Figure 40:
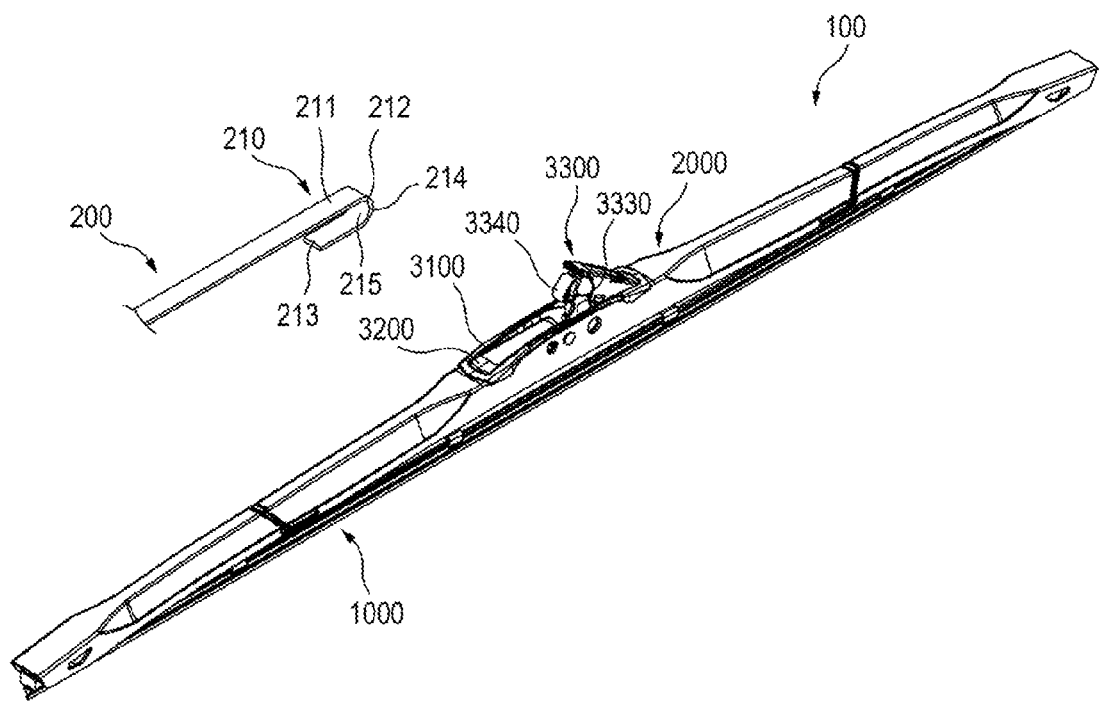
FIG. 40 shows a connection example between the wiper blade according to an embodiment and a hook wiper arm.

Referring to FIG. 40, the hook wiper arm 200, to which the wiper blade 100 according to the embodiment is applicable, has a hook coupling element 210 at its distal end. The hook coupling element 210 includes a linear portion 211, a hook portion 212 extending from the linear portion 211 and being curved in an approximately semicircular shape, and an extension portion 213 extending rearward from the hook portion 212 parallel to the linear portion 211. The hook portion 212 has an outer surface 214 serving as the outside of the semicircular shape and an inner surface 215 serving as the inside of the semicircular shape. Further, referring to FIGS. 41 and 42, the side pin wiper arm 300, to which the wiper blade 100 according to the embodiment is applicable, has a pin coupling element 310, 320 at its distal end. The pin coupling element 310 has a pin portion 311, which extends from the side pin wiper arm 300 approximately orthogonally thereto, and an annular groove 312 formed in the middle of the pin portion 311 in a circumferential direction of the pin portion 311. Further, the pin coupling element 320 has a pin portion 321, which has a diameter smaller than that of the pin portion 311, and an annular groove 322 formed in the middle of the pin portion 321 in a circumferential direction of the pin portion 321.

Referring to FIGS. 5 and 28 to 39, the connector assembly 3000 is configured to separably connect the lever assembly 2000, which holds the wiper rubber assembly 1000, to either the hook wiper arm 200 or the side pin wiper arm 300. The connector assembly 3000 includes a bracket 3100, an adaptor 3200 and a clamping cover 3300. The bracket 3100 is separably fixed to the first lever 2100 of the lever assembly 2000. The adaptor 3200 is located in the bracket 3100 and is rotatably coupled to the rotating shaft (the rivet 2141) of the first lever 2100. The clamping cover 3300 is pivotally coupled to the bracket 3100 opposite the adaptor 3200. The clamping cover 3300 clamps the hook coupling element 210 of the hook wiper arm 200 or the pin coupling element 310 of the side pin wiper arm 300 with respect to the adaptor 3200 or the bracket 3100.

Descriptions are made as to the bracket 3100 with reference to FIGS. 5 and 28 to 31. The bracket 3100 serves as a base for attachment of the adaptor 3200 and the clamping cover 3300. The bracket 3100 is fitted to the insertion opening 2111 of the first lever 2100. The bracket 3100 snap-engages the insertion opening 2111 of the first lever 2100 in such a manner that a portion of the bracket 3100 vertically sandwiches a portion of the top wall 2110 of the first lever 2100 in its thickness direction.

The bracket 3100 includes a wall portion 3110, which has the shape and size corresponding to those of the insertion opening 2111, and a collar portion 3120, which is formed along the upper edge of the wall portion 3110. The wall portion 3110 has a pair of end walls 3111L, 3111R, which are opposed in a longitudinal direction, and a pair of lateral walls 3112F, 3112R, which are opposed in a width direction. The collar portion 3120 protrudes slightly outwardly from the upper edges of the end walls 3111L, 3111R and the lateral walls 3112F, 3112R. The collar portion 3120 has downwardly protruding tab portions 3121F, 3121R adjacent to the ends of the lateral walls 3112F, 3112R.

The bracket 3100 includes elastic latches 3113 provided in the respective end walls 3111L, 3111R and engagement protrusions 3114 formed at free ends of the latches 3113, as an element for coupling to the first lever 2100. The latch 3113 is formed by cutting the upper portion of the end wall 3111L, 3111R in an inverted U-shape. Further, the bracket 3100 includes a positioning ridge 3115, which is configured to pass through the positioning notch 2112 provided at the edge of the insertion opening 2111 of the first lever 2100. The positioning ridge 3115 protrudes from the end wall 3111R below the latch 3113 and extends vertically. Further, the bracket 3100 includes a rivet slot 3116, which extends upwardly from the lower edge of the bracket, in the middle of each lateral wall 3112F, 3112R. The rivet 2141 provided in the first lever 2100 is fitted to the rivet slot 3116.

The bracket 3100 has a pair of fitting protrusions 3118F, 3118R, which protrude from the inner surface of the lateral walls 3112F, 3112R, as an element for pivotal attachment of the clamping cover 3300. The fitting protrusions 3118F, 3118R are adjacent to the end wall 3111R. Further, the bracket 3100 has an element for defining the clamping position of the clamping cover 3300. The bracket 3100 includes a pair of indents 3117, which are formed in the lateral walls 3112F, 3112R between the rivet slot 3116 and the end wall 3111R and are concaved upwardly from the lower edge of the lateral wall, and a pair of stopper notches 3122F, 3122R, which are located at the upper edge as opposed to each other in the collar portion 3120. The snap protrusions of the clamping cover 3300 engage the indents 3117 and the stopper tabs of the clamping cover 3300 are seated on the stopper notches 3122F, 3122R.

The bracket 3100 is coupled to the insertion opening 2111 of the first lever 2100 by positioning the bracket 3100 in the insertion opening 2111 and pressing the bracket 3100 towards the first lever 2100. When inserting the bracket 3100 to the insertion opening 2111, the positioning ridge 3115 of the bracket 3100 passes through the positioning notch 2112 of the insertion opening 2111, thereby positioning the bracket 3100 with respect to the first lever 2100. If the bracket 3100 is coupled to the first lever 2100, then the edge portion of the insertion opening 2111 of the first lever 2100 is positioned between the lower surface of the collar portion 3120 and the engagement protrusion 3114 and the rivet 2141 is fitted to the rivet slot 3116.

Further, the bracket 3100 has through holes to which the pin portions 311, 321 of the side pin wiper arm 300 are inserted. A pair of first through holes 3142, through which the pin portion 311 of the pin coupling element 310 of the side pin wiper arm 300 passes, are formed in the lateral walls 3112F, 3112R between the rivet slot 3116 and the indent 3117 in the width direction of the bracket 3100. Further, a pair of second through holes 3143, through which the pin portion 321 of the pin coupling element 320 of the side pin wiper arm 300 passes, are formed in the lateral walls 3112F, 3112R in the width direction of the bracket 3100 opposite the first through hole 3142 with the rivet slot 3116 therebetween. The second through hole 3143 is smaller than the first through hole 3142. The first through hole 3142 and the second through hole 3143 correspond to the first through hole 2142 and the second through hole 2143 of the first lever 2100 respectively.

Descriptions are made as to the adaptor 3200 with reference to FIGS. 5 and 32 to 35.

The adaptor 3200 is fitted in between the lateral walls 3112F, 3112R of the bracket 3100 and is rotatably coupled to the rivet 2141 of the first lever 2100. The adaptor 3200 is configured to support at least a portion of the linear portion 211 of the hook coupling element 210 and to accommodate the hook portion 212 therein. Further, the adaptor 3200 is configured to engage the pin portion 321 of the pin coupling element 320 and clamp the pin portion 321 to the bracket 3100 and the first lever 2100. The adaptor 3200 has a pair of lateral walls 3210F, 3210R and a bridge portion 3220 interconnecting the lateral walls 3210F, 3210R. The linear portion 211, the hook portion 212 and the extension portion 213 are situated between the lateral walls 3210F, 3210R. A plurality of arcuate ridges 3211, which frictionally contact the inner surfaces of the lateral walls 3112F, 3112R of the bracket 3100, protrude on the outer surfaces of the respective lateral walls 3210F, 3210R. The bridge portion 3220 extends between the lateral walls 3210F, 3210R from the rear end of the lateral wall 3210F, 3210R to the vicinity of the front end of the lateral wall. The front end of the bridge portion 3220 is spaced apart from the front end of the lateral wall 3210F, 3210R. Further, the rear end of the lateral wall 3210F, 3210R is located further inwardly than the rear end of the bridge portion 3220 and, thus, a stopper 3224 protrudes from the rear end of the bridge portion 3220. If the adaptor 3200 is pivoted to the bracket 3100, the collar portion 3120 of the bracket 3100 catches the stopper 3224, thereby restricting the pivotal movement of the adaptor 3200. The lateral walls 3210F, 3210R have a pair of inwardly protruding engagement protrusions 3212 at the front ends thereof. The outer surface 214 of the hook portion 212 of the hook coupling element 210 engages the engagement protrusions 3212.

The bridge portion 3220 includes a flat seat surface 3221 on which the linear portion 211 of the hook coupling element 210 is seated. The flat seat surface 3221 is a flat top surface of the bridge portion 3220 and is slightly declined with respect to the upper edges of the lateral walls 3210F, 3210R. Thus, stepped portions 3223F, 3223R are defined between the flat seat surface 3221 and the upper edges of the lateral walls 3210F, 3210R. The linear portion 211 of the hook coupling element 210 can be precisely positioned on the flat seat surface 3221 due to the stepped portions 3223F, 3223R. Further, the stepped portions 3223F, 3223R contact the linear portion 211 of the hook coupling element 210 in the lateral direction, thereby receiving forces in an oscillation direction during oscillation of the wiper arm 200.

Further, the bridge portion 3220 includes a curved seat surface 3222 contacting the hook portion 212 of the hook coupling element 210. The frontal surface of the bridge portion 3220, which extends from the flat seat surface 3221, is rounded such that the inner surface 215 of the hook portion 212 is seated thereon, thereby forming the curved seat surface 3222 for fixation of the hook portion 212.

The adaptor 3200 includes a rivet slot 3230 for coupling to the first lever 2100 of the lever assembly 2000. When viewing the adaptor 3200 from the front, the rivet slot 3230 extends from the lower edge of the later wall 3210F, 3210R to the vicinity of the front end of the bridge portion 3220. The innermost surface of the rivet slot 3230 is rounded and the rotating shaft of the first lever 2100 (the rivet 2141) is fitted to the rivet slot 3230.

The adaptor 3200 includes a bearing hole 3240 at the rear of the rivet slot 3230. The pin portion 321 of the pin coupling element 320 of the side pin wiper arm 300 is fitted to the bearing hole 3240. An engagement protrusion 3241 is formed in the inner surface of the bearing hole 3240 approximately midway in its width direction in a circumferential direction. The engagement protrusion 3241 engages the annular groove 322 of the pin portion 321 of the pin coupling element 320. When the adaptor 3200 is fitted to the bracket 3100 as being coupled to the first lever 2100 (the stopper 3224 of the adaptor 3200 is caught by the collar portion 3120 of the bracket 3100), the bearing hole 3240 is aligned with both the second through holes 2143 of the first lever 2100 and the second through holes 3143 of the bracket 3100.

Descriptions are made as to the clamping cover 3300 with reference to FIGS. 5 and 36 to 39.

The clamping cover 3300 is attached to the bracket 3100 so as to be pivotable in the longitudinal direction of the lever assembly 2000. The clamping cover 3300 assists in the fixation between the hook portion 212 of the hook coupling element 210 and the adaptor 3200 and the fixation between the pin portion 311 of the pin coupling element 310 and the bracket 3100.

The clamping cover 3300 has a top wall 3310 and a pair of lateral walls 3320F, 3320R downwardly extending from the lateral edges of the top wall 3310. The front end of the top wall 3310 protrudes more frontward than the front ends of the lateral walls 3320F, 3320R, thereby forming an empty space between the front end of the top wall 3310 and the front ends of the lateral walls 3320F, 3320R when the clamping cover 3300 is viewed from the front.

The clamping cover 3300 includes a fitting hole 3322F, 3322R for coupling to the bracket 3100 in the vicinity of the rear end of each lateral wall 3320F, 3320R. The fitting protrusion 3118F, 3118R of the bracket 3100 is fitted to the fitting hole 3322F, 3322R of the clamping cover 3300, pivotally coupling the clamping cover 3300 to the bracket 3100.

The clamping cover 3300 has an element for defining the clamping position with respect to the bracket 3100. The clamping cover 3300 includes a outwardly protruding snap protrusion 3321F, 3321R at the lower edge of each lateral wall 3320F, 3320R. Further, the clamping cover 3300 includes a stopper tab 3311F, 3311R protruding from each lateral edge of the top wall 3310. The stopper tab 3311F, 3311R is fitted to the stopper notch 3122F, 3122R provided in the collar portion 3120 of the bracket 3100. Since the stopper tab 3311F, 3311R engages the stopper notch 3122F, 3122R, the clamping cover 3300 cannot pivot downwardly from the bracket 3100 in the state where the snap protrusion 3321F, 3321R is in engagement with the indent 3117 of the bracket 3100.

Accordingly, the clamping cover 3300 is pivotable between the following two positions: the clamping position wherein the stopper tab 3311F, 3311R is fitted to the stopper notch 3122F, 3122R of the bracket 3100 and the snap protrusion 3321F, 3321R snap-engages the indent 3117 of the bracket 3100; and the release position wherein the clamping cover is pivoted upward with respect to the bracket 3100 from such clamping position. In the clamping position, the clamping cover 3300 clamps the hook portion 212 of the hook coupling element 210 to the adaptor 3200. Further, in the clamping position, the clamping cover 3300 clamps the pin portion 311 of the pin coupling element 310 to the bracket 3100 and the first lever 2100. If the clamping cover 3300 is pivoted upwardly of the bracket 3100 from the clamping position and is moved to the release position, then the fixation of the hook portion 212 or the pin portion 311 is released. The release position may be any position located between the position wherein the snap protrusion 3321F, 3321R of the clamping cover 3300 is separated from the indent 3117 of the bracket 3100 and the maximum pivotal position of the clamping cover 3300 relative to the bracket 3100.

The clamping cover 3300 includes a latch element which is configured to clamp the pin portion 311 of the pin coupling element 310 or the hook portion 212 of the hook coupling element 210 to the connector assembly 3000. Said latch element may be formed in the shape of an elastic bar downwardly protruding the underside of the top wall 3310 of the clamping cover 3300. In this embodiment, the clamping cover 3300 includes a first elastic latch 3330 that downwardly protrudes from the underside of the top wall 3310 of the clamping cover 3300 and a second elastic latch 3340 that protrudes frontward and downwardly from the first elastic latch 3330.

The first elastic latch 3330 clamps the pin portion 311 of the pin coupling element 310 with respect to the bracket 3100 and the first lever 2100. When viewing the clamping cover 3300 from the front, the first elastic latch 3300 has a curved section 3331, which is convex towards the rear end of the clamping cover 3300, at its lower end. Further, when viewing the wiper blade 100 from the front, if the clamping cover 3300 is fixed to the bracket 3100 in the clamping position, then the first elastic latch 3330 is positioned in the first through holes 3142 of the bracket 3100. The pin portion 311 of the pin coupling element 310 is inserted to the first lever 2100 and the connector assembly 3000 as passing through the first through holes 2142 of the first lever 2100 and the first through holes 3142 of the bracket 3100. When the clamping cover 3300 is fixed to the bracket 3100 in the clamping position, the first elastic latch 3300 engages the annular groove 312 of the pin coupling element 310 and the pin coupling element 310 is clamped to the first lever 2100 and the connector assembly 3000 thereby.

The second elastic latch 3340 clamps the hook portion 212 of the hook coupling element 210 with respect to the curved seat surface 3222 of the adaptor 3200. If the clamping cover 3300 is fixed to the bracket 3100 in the clamping position, the frontal surface of the second elastic latch 3340 comes into abutment with the outer surface 214 of the hook portion 212 and, thus, the hook portion 212 is pressed against the curved seat surface 3222 by the elastic force of the second elastic latch 3340 and comes into close contact therewith. When viewing the clamping cover 3300 from the front, the second elastic latch 3340 includes: a first curved section 3341 extending from the first elastic latch 3341 and being curved frontward; a second curved section 3342 extending from the first curved section 3341 and being curved reversely to the first curved section 3341; and a third curved section 3343 extending from the second curved section 3342 and being curved frontward in the same direction as the first curved section 3341. If the clamping cover 3300 is fixed to the bracket 3100 in the clamping position, then the second curved section 3342 of the second elastic latch 3340 comes into abutment with the outer surface 214 of the hook portion 212 of the hook coupling element 210. Since the second elastic latch 3340 extends in a wavy shape through the first to third curved sections 3341, 3342, 3343, the second elastic latch 3340 can press the hook portion 212 of the hook coupling element 210 against the curved seat surface 3222 of the adaptor 3200 with stronger pressure force.

FIG. 40 shows a connection example between the wiper blade 100 according to an embodiment and the hook wiper arm 200.

Referring to FIG. 40, in the state where the clamping cover 3300 is turned upward from the bracket 3100 and is in the release position, the extension portion 213 of the hook coupling element 210 is inserted through between the lateral walls 3210F, 3210R from the front ends of the lateral walls 3210F, 3210R towards the underside of the bridge portion 3220. Once the insertion is complete, the linear portion 211 of the hook coupling element 210 is seated on the flat seat surface 3221 of the bridge portion 3220 between the stepped portions 3223F, 3223R, the inner surface 215 of the hook portion 212 is seated on the curved seat surface 3222 of the bridge portion 3220, and the extension portion 213 is situated below the bridge portion 3220. Further, once the insertion is complete, the engagement protrusions 3212 of the lateral walls 3210F, 3210R come into engagement with the outer surface 214 of the hook portion 212. Thereafter, the clamping cover 3300 is pivoted towards the bracket 3100 and is fixed to the bracket 3100 in the clamping position. When the clamping cover 3300 is completely fixed, the second elastic latch 3340 of the clamping cover 3300 comes into contact with the outer surface 214 of the hook portion 212 at the frontal surface of the second curved section 3342 and, thus, the second elastic latch 3340 fixes the hook portion 212 as pressing the hook portion 212 against the curved seat surface 3322. Accordingly, the hook coupling element 210 is fixed to the connector assembly 3000 as the linear portion 211 is positioned between the stepped portions 3223F, 3223R of the adaptor 3200 and the hook portion 212 is pressed against the curved seat surface 3222 of the adaptor 3200.

Figure 41:
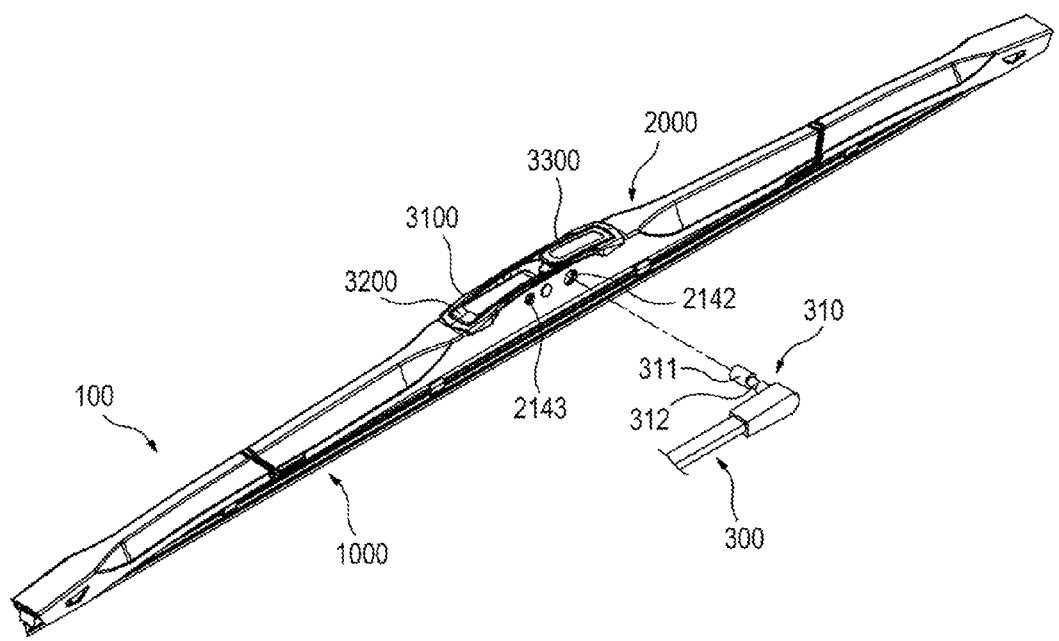
FIG. 41 shows a connection example between the wiper blade according to an embodiment and a side pin wiper arm.
Figure 42:
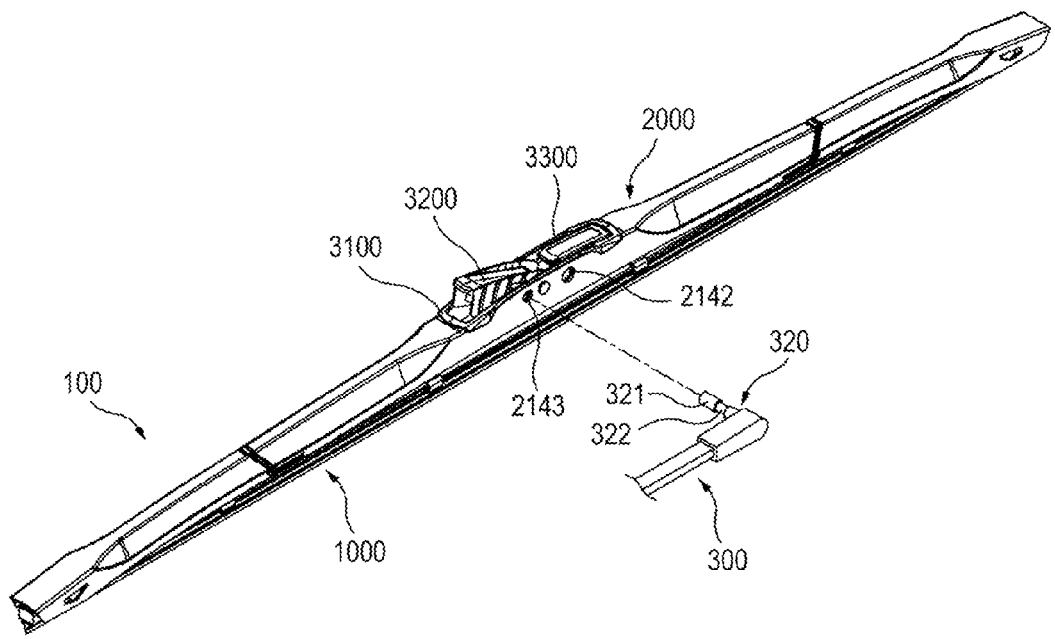
FIG. 42 shows another connection example between the wiper blade according to an embodiment and a side pin wiper arm.

FIGS. 41 and 42 show a connection example between the wiper blade 100 according to an embodiment and the side pin wiper arm 300.

The wiper blade 100 is connected to the side pin wiper arm 300 in such a manner that the pin portion 311, 321 of the pin coupling element 310, 320 passes through the lever assembly 2000 and the connector assembly 3000. As shown in FIG. 41, in the state where the clamping cover 3300 is positioned in the bracket 3100 in the clamping position, the pin portion 311 of the pin coupling element 310 is inserted to the bracket 3100 of the connector assembly 3000 through the first through hole 2142 of the first lever 2100 and then protrudes through the opposite first through hole 2142. When the pin portion 311 passes through the first lever 2100 and the connector assembly 3000, the pin portion 311 passes through the through holes in the following order: the first through hole 2142 of the lateral wall 2120F of the first lever 2100; the first through hole 3142 of the lateral wall 3112F of the bracket 3100; the first through hole 3142 of the lateral wall 3112R of the bracket 3100; and the first through hole 2142 of the lateral wall 2120R of the first lever 2100. When the pin portion 311 of the pin coupling element 310 passes through the first lever 2100 and the connector assembly 3000, the first elastic latch 3330 of the clamping cover 3300 comes into engagement with the annular groove 312 of the pin portion 311, thereby clamping the pin portion 311 of the pin coupling element 310 to the first lever 2100 and the connector assembly 3000. By way of another example, in the state where the clamping cover 3300 is positioned in the bracket 3100 in the release position, the pin portion 311 of the pin coupling element 310 is inserted to the bracket 3100 of the connector assembly 3000 through the first through hole 2142 of the first lever 2100 and the first through hole 3142 of the bracket 3100 and then protrudes through the opposite first through hole 2142. Thereafter, the clamping cover 3300 is pivoted towards the bracket 3100 and is fixed to the bracket 3100 in the clamping position. When the clamping cover 3300 is fixed, the first elastic latch 3330 of the clamping cover 3300 comes into engagement with the annular groove 312 of the pin portion 311, thereby clamping the pin portion 311 of the pin coupling element 310 to the first lever 2100 and the connector assembly 3000. Referring to FIG. 42, in the state where the adaptor 3200 is slightly tilted from the bracket 3100 such that the rear end of the adaptor 3200 is raised up, the pin portion 321 of the pin coupling element 320, the diameter of which is smaller than the pin portion 311, is inserted into the connector assembly 3000 through the second through hole 2143 of the lateral wall 2120F of the first lever 2100 and then protrudes through the second through hole 2143 located in the lateral wall 2120R of the first lever 2100. If the adaptor 3200 is pivoted to the bracket 3100 and the stopper 3224 of the adaptor 3200 is caught by the collar portion 3120 of the bracket 3100, then the pin portion 321 of the pin coupling element 320, which passes through the connector assembly 3000, is fitted to the bearing hole 3240 of the adaptor 3200. When the pin portion 321 is fitted to the bearing hole 3240, the engagement protrusion 3241 of the bearing hole 3240 comes into engagement with the annular groove 322 of the pin portion 321, thereby clamping the pin portion 321 of the pin coupling element 320 to the first lever 2100 and the connector assembly 3000.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wiper blade, comprising:
   a wiper rubber; and
   a lever assembly holding the wiper rubber and being connected to a wiper arm, the lever assembly comprising a plurality of levers rotatably connected and a lever joint interposed between an inner surface of one of the adjacent levers among the plurality of levers and an outer surface of the other of the adjacent levers, the lever joint rotatably interconnecting the adjacent levers,
   wherein at least one of the plurality of levers has a partial spoiler extending in a longitudinal direction of the lever assembly,
   wherein the lever joint is fitted to the one of the adjacent levers through insertion in the longitudinal direction and is rotatably coupled to the other of the adjacent levers through pressing,
   wherein the one of the adjacent levers includes a pair of fitting protrusions extending in the longitudinal direction,
   wherein the other of the adjacent levers includes a pair of fitting protrusions protruding in a width direction of the lever assembly,
   wherein the lever joint includes a pair of fitting grooves extending in the longitudinal direction, the fitting protrusions of the one of the adjacent levers being fitted to the fitting grooves respectively, and a pair of fitting holes, to which the fitting protrusions of the other of the adjacent levers are fitted respectively,
   wherein the pair of fitting protrusions of the one of the adjacent levers are fitted to the pair of the fitting grooves of the lever joint respectively through insertion in the longitudinal direction,
   wherein the lever joint is hinge-jointed to the other of the adjacent levers by the pair of fitting holes of the lever joint and the pair of fitting protrusions of the other of the adjacent levers,
   wherein the one of the adjacent levers includes a cutout formed in each of the pair of fitting protrusions of the one of the adjacent levers, and
   wherein the lever joint includes a latch located in each of the pair of fitting grooves and engaging the cutout.

2. The wiper blade of claim 1, wherein the lever assembly comprises a first lever connectable to the wiper arm, a pair of second levers connected to respective longitudinal outer ends of the first lever, and a pair of third levers connected to respective longitudinal outer or inner ends of the second levers, and
   wherein the partial spoiler comprises a first partial spoiler formed in the first lever and a second partial spoiler formed in the second lever, and
   wherein the lever joint is interposed between an inner surface of the first lever and an outer surface of the second lever.

3. The wiper blade of claim 2, wherein the second lever includes a spoiler cover disposed at a portion of the second lever, the second partial spoiler being formed in the spoiler cover.

4. The wiper blade of claim 3, wherein the second lever includes a pair of engagement lugs at the longitudinal inner end thereof and a pair of concavities at the longitudinal outer end thereof, and
   wherein the spoiler cover includes a pair of notches, to which the pair of engagement lugs are fitted respectively, at a longitudinal inner end thereof and a pair of dents, which snap-engage the concavities respectively, at a longitudinal outer end thereof.

5. The wiper blade of claim 3, wherein the first lever has a pair of first inclined surfaces defining the first partial spoiler, the first inclined surfaces extending in a longitudinal direction of the first lever and being inclined inwardly of the first lever in a width direction of the first lever, and
   wherein the spoiler cover has a pair of second inclined surfaces defining the second partial spoiler, the second inclined surfaces extending in a longitudinal direction of the spoiler cover and being inclined inwardly of the spoiler cover in a width direction of the spoiler cover.

6. The wiper blade of claim 3, wherein the spoiler cover is integrated in the portion of the second lever.

7. The wiper blade of claim 2, wherein the first lever has an end surface at the longitudinal outer end, the end surface being inclined towards a distal end of the lever assembly, and
   wherein the second lever has a stepped surface opposite the end surface of the first lever and inclined towards the distal end of the lever assembly.

8. The wiper blade of claim 1, wherein the lever assembly includes an insertion opening at a middle thereof and a rotating shaft mounted to the insertion opening in a width direction of the lever assembly, and
   wherein the wiper blade further comprises a connector assembly for connection to the wiper arm, the connector assembly being fitted to the insertion opening and coupled to the rotating shaft.

9. The wiper blade of claim 8, wherein the connector assembly comprises:
   an adaptor rotatably coupled to the rotating shaft and being configured to contact a coupling element provided at a distal end of the wiper arm; and
   a clamping cover pivotable between a clamping position for clamping the coupling element of the wiper arm and a release position for releasing fixation of the coupling element of the wiper arm.

10. The wiper blade of claim 9, wherein the coupling element of the wiper arm comprises a pin portion, and
    wherein the clamping cover includes a first elastic latch engaging the pin portion in the clamping position.

11. The wiper blade of claim 10, wherein the coupling element of the wiper arm further comprises a hook portion,
    wherein the clamping cover includes a second elastic latch extending from the first elastic latch, the second elastic latch pressing the hook portion against the adaptor in the clamping position, and wherein the second elastic latch extends from the first elastic latch in a wavy shape.

12. A wiper blade, comprising:
a wiper rubber;
a first lever having a centrally located insertion opening, a pair of first partial spoilers extending from the insertion opening to respective longitudinal outer ends, and a rotating shaft mounted to the insertion opening in a width direction;
a pair of second levers connected to the respective longitudinal outer ends of the first lever and having a finger for grasping the wiper rubber at a longitudinal outer end thereof, the second lever including a spoiler cover that is disposed between the longitudinal outer end of the first lever and the longitudinal outer end of the second lever;
a pair of third levers rotatably connected to respective longitudinal inner ends of the second levers at a middle thereof and having fingers for grasping the wiper rubber at respective longitudinal ends thereof; and
a pair of lever joints, each being interposed between an inner surface of the first lever and an outer surface of the second lever, the lever joint being fitted to the first lever through insertion in a longitudinal direction of the first lever and being rotatably coupled to the second lever through pressing,
wherein the spoiler cover has a second partial spoiler extending in a longitudinal direction thereof,
wherein the first lever includes a pair of fitting protrusions extending in the longitudinal direction thereof and protruding inwardly from a lower edge thereof, and a cutout formed in each of the pair of fitting protrusions of the first lever,
wherein the second lever includes a pair of fitting protrusions protruding in a width direction at the outer surface thereof,
wherein the lever joint includes a pair of fitting grooves extending in the longitudinal direction, the fitting protrusions of the first lever being fitted to the pair of fitting grooves respectively, at a lower edge thereof and a pair of fitting holes, to which the fitting protrusions of the second lever are fitted respectively, at a middle thereof,
wherein the lever joint includes a latch located in each of the pair of fitting grooves and engaging the cutout,
wherein the pair of fitting protrusions of the first lever are fitted to the pair of the fitting grooves of the lever joint respectively through insertion in the longitudinal direction, and
wherein the lever joint is hinge-jointed to the second lever by the pair of fitting holes of the lever joint and the pair of fitting protrusions of the second lever.

13. The wiper blade of claim 12, wherein the second lever includes a pair of engagement lugs at the longitudinal inner end thereof and a pair of concavities at the longitudinal outer end thereof, and
wherein the spoiler cover includes a pair of notches, to which the pair of engagement lugs of the second lever are fitted respectively, at a longitudinal inner end thereof and a pair of dents, which protrude inwardly to snap-engage the concavities of the second lever respectively, at a longitudinal outer end thereof.

14. The wiper blade of claim 12, wherein the first lever has a pair of first inclined surfaces defining the first partial spoiler, the first inclined surfaces extending in the longitudinal direction of the first lever and being inclined inwardly of the first lever in a width direction of the first lever, and
wherein the spoiler cover has a pair of second inclined surfaces defining the second partial spoiler, the second inclined surfaces extending in the longitudinal direction of the spoiler cover and being inclined inwardly of the spoiler cover in a width direction of the spoiler cover.

15. The wiper blade of claim 12, wherein the spoiler cover is integrated in a portion of the second lever.

16. The wiper blade of claim 12, wherein the first lever has an end surface at the longitudinal outer end thereof, the end surface being inclined towards the longitudinal outer end of the second lever, and
wherein the second lever has a stepped surface opposite the end surface of the first lever and inclined towards the longitudinal outer end of the second lever.

17. The wiper blade of claim 12, further comprising:
a bracket fitted to the insertion opening;
an adaptor fitted to the bracket and rotatably coupled to the rotating shaft, the adaptor being configured to contact a coupling element provided at a distal end of a wiper arm; and
a clamping cover pivotally coupled to the bracket opposite the adaptor, the clamping cover being pivotable between a clamping position for clamping the coupling element of the wiper arm to the bracket or the adaptor and a release position for releasing fixation of the coupling element of the wiper arm to the bracket or the adaptor.

18. The wiper blade of claim 17, wherein the clamping cover includes a pair of stopper tabs at an upper edge thereof and a pair of snap protrusions at a lower edge thereof, and
wherein the bracket includes a pair of stopper notches, on which the pair of stopper tabs are seated, at an upper edge thereof and a pair of indents, which the pair of snap protrusions snap-engage, at a lower edge thereof.

19. The wiper blade of claim 17, wherein the coupling element of the wiper arm comprises a pin portion,
wherein the first lever includes a pair of first through holes adjacent to the rotating shaft and being perforated in the width direction, the pin portion passing through the pair of first through holes,
wherein the clamping cover includes a first elastic latch, and
wherein when the clamping cover is positioned in the clamping position, the first elastic latch is located in the first through holes to engage the pin portion.

20. The wiper blade of claim 19, wherein the coupling element of the wiper arm further comprises a hook portion,
wherein the adaptor includes a curved seat surface on which the hook portion is seated,
wherein the clamping cover includes a second elastic latch extending from the first elastic latch,
wherein when the clamping cover is positioned in the clamping position, the second elastic latch presses the hook portion against the curved seat surface,
wherein the second elastic latch includes:
a first curved section extending from the first elastic latch;
a second curved section extending from the first curved section and being curved reversely to the first curved section; and
a third curved section extending from the second curved section and being curved in a same direction as the first curved section, and wherein the second elastic latch presses the hook portion against the curved seat surface at the second curved section.

21. The wiper blade of claim 19, wherein the coupling element of the wiper arm further comprises another pin portion having a diameter smaller than said pin portion,
wherein the first lever includes a pair of second through holes adjacent to the rotating shaft and being perforated in the width direction opposite the first through hole, said another pin portion passing through the pair of second through holes, and
wherein the adaptor includes a bearing hole aligned with the second through holes, said another pin portion being fitted to the bearing hole.

22. The wiper blade of claim 17, wherein the first lever includes a positioning notch at an edge of the insertion opening and the bracket includes a positioning ridge corresponding to the positioning notch.

\* \* \* \* \*